United States Patent
Yasue et al.

(10) Patent No.: US 7,480,520 B2
(45) Date of Patent: Jan. 20, 2009

(54) GATEWAY RELAYING COMMUNICATION BETWEEN A RADIO INTELLIGENT TERMINAL AND A SERVER

(75) Inventors: Reiko Yasue, Aichi-ken (JP); Noritake Okada, Kanagawa-ken (JP)

(73) Assignee: Panasonic Corporation, Osaka (JP)

( * ) Notice: Subject to any disclaimer, the term of this patent is extended or adjusted under 35 U.S.C. 154(b) by 499 days.

(21) Appl. No.: 10/972,441

(22) Filed: Oct. 26, 2004

(65) Prior Publication Data
US 2005/0083903 A1    Apr. 21, 2005

Related U.S. Application Data

(62) Division of application No. 09/406,833, filed on Sep. 28, 1999, now Pat. No. 6,826,396.

(30) Foreign Application Priority Data

Sep. 30, 1998 (JP) .............................. H10-277182
Dec. 2, 1998 (JP) .............................. H10-342879

(51) Int. Cl.
*H04L 12/58* (2006.01)
*G01R 31/08* (2006.01)
*H04J 3/24* (2006.01)

(52) U.S. Cl. .................... 455/560; 455/403; 455/412.1; 370/349

(58) Field of Classification Search ................. 455/403, 455/412.1, 560; 370/349
See application file for complete search history.

(56) References Cited

U.S. PATENT DOCUMENTS 5,631,946 A    5/1997    Campana et al.
5,991,828 A   11/1999    Horie et al.

(Continued)

FOREIGN PATENT DOCUMENTS

JP          07-250092          9/1995

(Continued)

OTHER PUBLICATIONS

Hayashi, Hiroaki, "Mobile Computing and Remote Access Technique; Outline and Format of PPP Protocol." Open Design, Apr. 1, 1997, vol. 4, No. 12, pp. 36-65 (Japan w/English Translation).

(Continued)

*Primary Examiner*—William D Cumming
(74) *Attorney, Agent, or Firm*—McDermott Will & Emery LLP

(57) ABSTRACT

In a communication system for establishing the communication between a radio intelligent terminal and a server via gateways, it is necessary to notify a non-communicating and a disconnecting radio intelligent terminal of an address of an exchange-destination gateway at the time of changing from a gateway to be used at all time to an exchange-destination gateway for some reason. To achieve the above object, a communication system comprises address notifying means for notifying the radio intelligent terminal of the address of the exchange-destination gateway according to a gateway exchange instruction inputted by an operation. The address notice is sent to the non-communicating terminal at the time of inputting the gateway exchange instruction, and is sent to the disconnecting terminal when it can start the communication.

1 Claim, 21 Drawing Sheets

U.S. PATENT DOCUMENTS

| | | | |
|---|---|---|---|
| 6,012,100 | A | 1/2000 | Frailong et al. |
| 6,073,172 | A | 6/2000 | Frailong et al. |
| 6,097,797 | A | 8/2000 | Oseto |
| 6,230,194 | B1 | 5/2001 | Frailong et al. |
| 6,473,411 | B1 | 10/2002 | Kumaki et al. |
| 6,633,555 | B1 | 10/2003 | Lin et al. |
| 6,707,891 | B1 | 3/2004 | Guedalia |
| 6,826,396 | B1 * | 11/2004 | Yasue et al. ............... 455/412.1 |
| 7,088,992 | B2 * | 8/2006 | Yasue et al. ............... 455/412.1 |
| 2001/0036184 | A1 | 11/2001 | Kinoshita et al. |
| 2001/0038689 | A1 | 11/2001 | Liljestrand et al. |
| 2002/0016858 | A1 | 2/2002 | Sawada et al. |
| 2004/0047292 | A1 | 3/2004 | Du Crest et al. |
| 2005/0054323 | A1 * | 3/2005 | Yasue et al. ................. 455/403 |
| 2005/0083903 | A1 * | 4/2005 | Yasue et al. ................. 370/349 |

FOREIGN PATENT DOCUMENTS

| | | |
|---|---|---|
| JP | 08-006887 | 1/1996 |
| JP | 8-172449 | 7/1996 |
| JP | 9-198293 | 7/1997 |
| JP | 10-173582 | 9/1998 |
| JP | 2000-174824 | 6/2000 |
| JP | 2000-228679 A | 8/2000 |
| JP | 2004-120771 A | 4/2004 |

OTHER PUBLICATIONS

Oono, Toshiharu, "PPP and Dialup IP Connect." UNIX Magazine, Feb. 1, 1995, vol. 10, No. 2, pp. 33-44 (Japan w/English Translation).

* cited by examiner (a)

(b)

(c)

Session flag
0 = Standard session
1 = Simplified session

GATEWAY RELAYING COMMUNICATION BETWEEN A RADIO INTELLIGENT TERMINAL AND A SERVER

This application is a divisional of application Ser. No. 09/406,833 filed Sep. 28, 1999 now U.S. Pat. No. 6,826,396.

BACKGROUND OF THE INVENTION

1. Field of the Invention

This invention relates to a radio communication system, more specially, gateway exchange methods for said system, and gateways, radio intelligent terminals and radio communication system utilized for said methods.

2. Description of the Prior Art

In recent years, the Internet Services such as WWW (World Wide Web) and etc. become so popular rapidly that the expansion of the computer network scales and the diversity of said connecting modes could be making advances.

In order to meet said progress, the gateways which connect intelligent terminals and servers via network are required to improve the processing ability and to increase the functions.

An example of the diversity of the connecting mode is a mobile computing. The mobile computing is a radio communication network which is able to be used by using a mobile terminal network such as portable phone network and by adding a radio communication function to an intelligent terminal even at the time of moving or even at a place impossible to connect directly with the computer network FIGS. 1 and 2 are conceptual view showing the communication mode adopting the above radio communication network.

FIG. 1 shows a constitution of the radio communication network with public network or in-house network for example, Local Area Network (LAN).

When an user executes an application in a terminal 1, the terminal 1 is connected with a server 6 via a radio base station 2, a network 3, and a gateway 4 or 5, and then the communication is established between the terminal 1 and the server 6. And the application is to be executed.

FIG. 2 shows an example of a radio communication network without passing through a network wherein gateways themselves have a server function, and which is operated in smaller area like an office than a place as shown in FIG. 1. Namely, the communication is established between the terminal 1 and the gateway 4 or 5 via radio base stations 2 or 10 and the application is to be executed.

In the radio communication network as described above, it is necessary to stop the operation of gateways temporarily for increasing functions of gateways to meet the change of networks and for operating the regular maintenance and so on. In order to continue the network operation on the stopped status of the gateway, it is necessary that the network is provided with the gateway exchange function, that is, a plural gateways are to be prepared as shown in FIGS. 1 and 2, and in case of deactivating the function of the gateway, the communication is to be established between the terminal and the server through the other gateway 5.

The outline of the communication protocol between the terminal and the gateway will be explained according to FIG. 7.

An application 71 in the terminal is a program such as WWW browser that an user operates directly. And an application 75 in the gateway (as shown in FIG. 2, the case of the gateway including server function is taken as an example) is a program for exchanging information with an application in the terminal, for example, a WWW server software.

A session layer protocol handler 72 (represented by a "S.L. protocol handler" hereinafter) is protocol means for offering a transfer controlling function which is common to various applications 71 and 75, for example, means such as a transfer processing of dividing into a transferable data and of transferring data per divided unit. A management entity means 73 (represented by a "M. entity means" hereinafter) is a program for managing system resources (such as a memory) which is used by a plural session processes generating at the data communication between a terminal and a server, and for managing processings over the whole system (for example, notice of a gateway exchange timing). A lower layer protocol handler 74 is a program and device for performing a communication control.

FIG. 31 shows a sequence of the communication mode in FIG. 2.

A S.L. protocol handler 3102 in a terminal 1 is in communication 3103 with a S.L. protocol handler 3104 in the gateway 4 in order to execute the application 3101. At this time, an gateway exchange instruction 3108 is inputted by an operator to a M. entity means 3105 in the gateway 4, and the M. entity means 3105 sends a disconnection notice 3109 to the S.L. protocol handler 3102 in the terminal 1 via the S.L. protocol handler 3104. Accordingly the S.L. protocol handler 3102 in the terminal 1 performs the disconnect display 3110 to the application 3101 or not, and then the execution of the application 3101 is suspended.

After the gateway 4 sends out the disconnection notice 3109, the gateway 4 gets into shutdown according to the operator's instruction or the function of the gateway 4. After that, the terminal 1, in order to re-execute the application 3101 thus suspended, requests the S.L. protocol handler 3102 to re-connect 3111 with the gateway 5 according to the address information in the terminal itself.

After the session 3112 is established between the S.L. protocol handler 3102 in the terminal 1 and the S.L. protocol handler 3106 in the gateway 5, the terminal 1 changes to be in communication 3113 with the gateway 5 and then it is possible to re-execute the application 3101 which has been suspended.

In the conventional technique as described above, however, there are some problems as follows.

In order to perform the gateway exchanging because of the shutdown of a gateway, the terminal has to store beforehand in the memory the address information about a plural gateways to be changeable objects. But the meaning that the information necessary only for exchanging the connection of gateway are always stored in the terminal is equivalent to the wasteful use of resources, and is not preferable for the terminal which has to be compact and provided with many functions.

And another problem is that, whenever that the network constitution changes according to the addition, the delete and etc. of severs or gateways, the gateway address information stored in the terminal have to be updated.

The method to solve the above problems, which is disclosed in the Japanese patent application No. 11-198675 filed in the name of this applicant, is to notify the exchange-destination gateway address to each terminal which is in communication with the exchange-original gateway at the time of shutdown. But this method is not available for the non-communicating terminals or the disconnecting terminals explained hereinafter.

The "non-communicating" terminal means the status that a terminal can always receive incoming signals from the other terminals even when the session (logical connection) is not established although the switch is turned on, that is to say, it is in the state of "standing by". Meanwhile, the "disconnecting" terminal means the status that the terminal is switched off, or the status that the terminal cannot get into communication with a gateway because of standing outside the communication zone even though the switch is turned on.

In other words, there has not been any method for notifying the non-communicating or the disconnecting terminals of the address of the exchange-destination gateway. In the method disclosed in the Japanese patent application No. 11-198675, in case gateways changes when terminals are in the state of non-communicating or disconnecting, said terminals cannot receive the address of the exchange-destination gateway. Therefore the terminals cannot execute applications until the exchange-original gateway start up its operation again.

The present invention is proposed in order to solve the above problems, and provided with a radio communication system for notifying the address of the exchange-destination gateway and etc. to non-communicating or disconnecting terminals when the terminals starts the communication, in case the gateway exchange instruction was inputted by an operator. Therefore it is possible to avoid the wasteful use of the memory, to meet various changes of the network constitution easily, and to execute applications via the network at any time.

SUMMARY OF THE INVENTION

In order to achieve the above object the invention adopts the following means, and it is explained according to FIG. 8.

The invention is applied to the case that there is a necessity in the communication system establishing the communication between a radio intelligent terminal and a server via gateway to change to the other gateway from a gateway used all the time (called as an "exchange-original gateway" or an "original gateway") which stops its operation for some reason.

First, it is arranged in this invention that a gateway 200 is provided with address notifying means 201 for notifying a radio intelligent terminal 300 of an address of an exchange-destination gateway (IP address) when a gateway exchange instruction is inputted by an operator 100. The address notifying means 201 consists of management entity means 73 and a session layer protocol handler 72.

And the address notifying means 201 sends an address notice including an exchange notifying signal and an address of an exchange-destination gateway as shown in FIG. 8(b) to the radio intelligent terminal 300 by means of communication means 202 of the gateway 200. Here, the communication means 202 is an unit consisting of the management entity means 73, the session layer protocol handler 72 and a lower layer protocol handler 74.

The address notifying means 201 has the same address (IP address) as that of the gateway 200 and can works even after the gateway 200 stops the function of connecting a server and radio intelligent terminals.

Under these constitution, in case of inputting the gateway exchange instruction by an operator, the address notifying means 201 sends the address notice to the non-communicating terminals, but until the disconnecting terminal starts up the communication with the gateway 200 the disconnecting terminal cannot receive the address notice from the address notifying means 201 having the same address as the gateway 200.

Next, the radio intelligent terminal 300 is provided with address changing means 302 for changing to the address of the exchange-destination gateway from the original address of the gateway 200 stored by the memory 301. The address changing means 302 in the radio intelligent terminal 300 consists of the management entity means 73 and the session layer protocol handler 72.

The address changing means 302 is activated by the exchange notifying signal included in the address notice received by the communication means 303 (the management entity means 73, the session layer protocol handler 72 and the lower layer protocol handler 74), and changes from the original gateway 200 address stored by the memory 301 to the address of the exchange-destination gateway.

According to these arrangements, it is possible to notify the non-communicating or disconnecting terminals of the address of the exchange-destination gateway.

The address notifying means 201 in the invention also can be replaced by an address notifying apparatus 210 separated from the gateway 200 shown as in FIG. 8(c). In this case, the address notifying apparatus 210 consists of communication means 211 (the management entity means 73, the session layer protocol handler 72 and the lower layer protocol handler 74) and a memory 212 for storing the address of the exchange-destination gateway.

Moreover, the address notifying apparatus 210 has the same address (IP address) as the gateway 200. At the time of the shutdown of the gateway 200, the address of the exchange-destination gateway is stored by the memory 212 via the communication means 202 and 211. And after the gateway 200 is inactive and is released from the communication with the communication system, the address notifying apparatus 210 is connected to the communication system instead of the gateway 200. Accordingly, the address of gateway 200 does not overlap with that of the address notifying apparatus 210 in the whole system.

DESCRIPTION OF THE PREFERRED EMBODIMENT

The embodiments of the present invention will be explained hereinafter. Embodiments 1 and 2 are concerned with non-communicating terminals, and embodiments 3 and 4 are concerned with disconnecting terminals.

Embodiment 1

Figure 1:
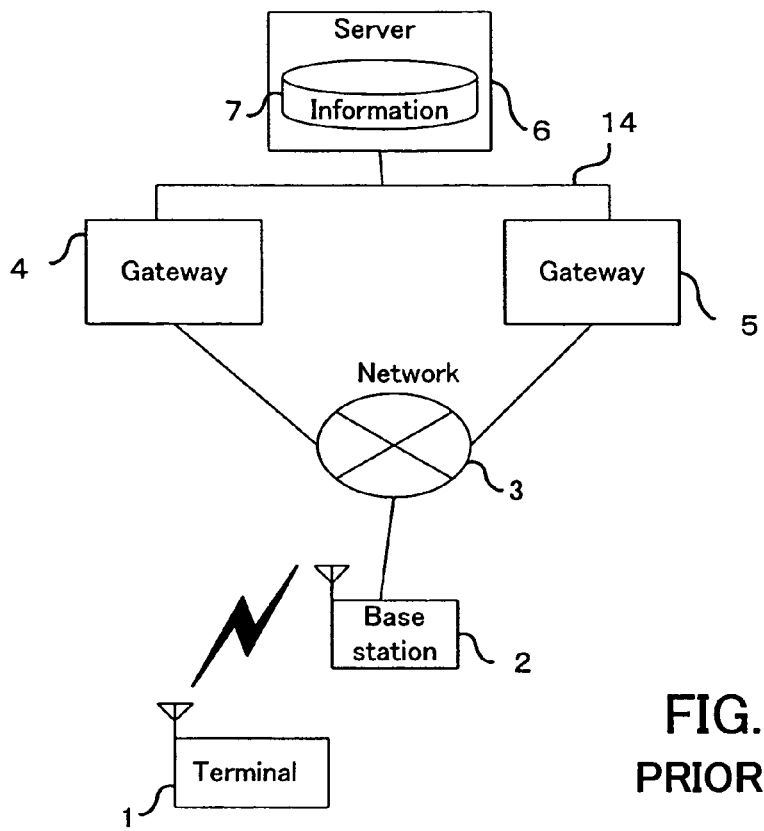
FIG. 1 is a constitutional view of a radio communication system with gateways sharing a common server via public or in-house network in the embodiment of the invention.

FIG. 1 shows the constitution of a radio communication system with gateways having a common server via public network in the embodiment 1 of the invention.

A terminal 1 is a radio intelligent terminal such as a notebook-type personal computer connected with a portable phone. A base station 2 is a base station for a portable phone. And a network 3 is a public network for a portable phone.

A gateway 4 shares a server 6 with a gateway 5. The server 6 is connected with the network 3 via the gateway 4 and 5. The terminal 1 is connected with the server 6 via the base station 2, the network 3 and the gateway 4 or 5. Under these conditions, the terminal 1 executes the application using the information 7 included in the server 6.

The first embodiment takes as an example the case that an user activates a WWW browser in the terminal 1 and get into communication with a WWW server software in the server 6, on the assumption that the terminal 1 is connected with the gateway 5 as the original gateway (exchange-original gateway) and the address of the gateway 4 has been registered on the memory of the terminal 1. Furthermore, the "non-communicating" terminal explained below is defined as a status that a terminal can receive the incoming signals from the other terminals even when a session (logical connection) is not established although the switch is turned on, that is, a status of "standing by".

Under these constitution, referring to FIG. 9, it is explained hereinafter a sequence of notifying the non-communicating terminal 1 of the address of the exchange-destination gateway (the gateway 5) when there is a necessity for deactivating the gateway 4 for some reason.

When an operator inputs a gateway exchange instruction into the gateway 4, a session layer protocol handler 903 (represented by "S.L. protocol handler" hereinafter) in the gateway 4 sends a connection request 912 to a S.L. protocol handler 902 in the terminal 1 for establishing a simplified session described later. And the terminal 1 received the connection request 912 sends a connection confirmation 913 from the S.L. protocol handler 902, therefore the simplified session is established.

The simplified session is available for the communication of transferring messages which contents are specified in advance, for example, the specific number of massages or the fixed data size. And the steps for establishing the simplified session is different from that of the standard session which is a logical session established to transfer the data as described later.

Figure 10:
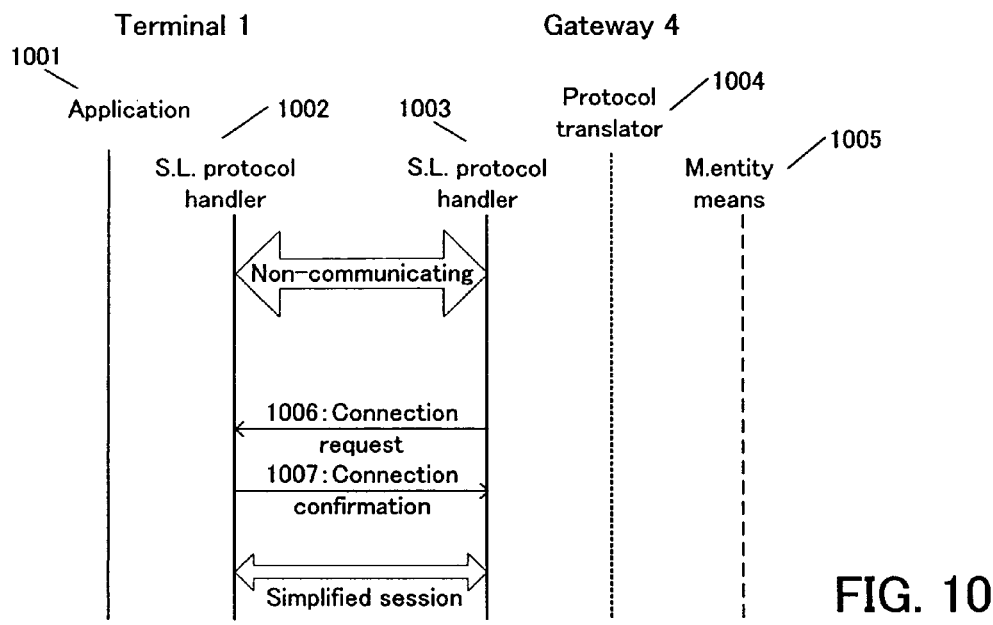
FIG. 10 shows a sequence of establishing the simplified session in the embodiment of the invention.
Figure 12:
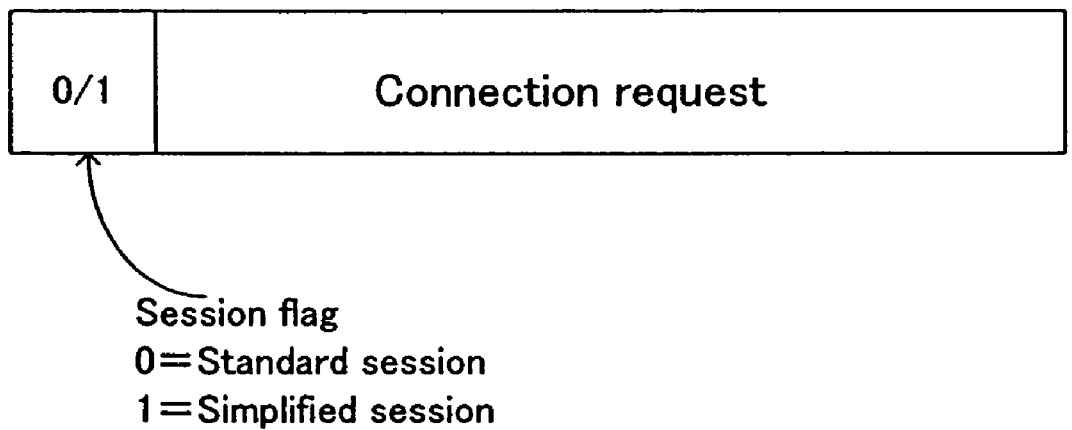
FIG. 12 shows a data structure of the connection request which is sent for establishing the simplified session in the embodiment of the invention.

The steps for establishing the simplified session is explained according to FIG. 10. First, a S.L. protocol handler 1003 in the gateway 4 sends a connection request 1006 to a S.L. protocol handler 1002 in the terminal 1. This connection request 1006 has a data structure shown in FIG. 12, and the head of which includes a flag indicating a connection request for the simplified session. With reference to the flag, the S.L. protocol handler 1002 sends a connection confirmation 1007 to the S.L. protocol handler 1003 in the gateway 4 in order to establish the simplified session, accordingly the simplified session is established.

The simplified session as described above can be established by only the steps of exchanging the connection request and the connection confirmation between the terminal and the gateway, therefore, it is possible to carry out high-speed processings by protocol meanings simplified more than the standard session.

And at the simplified session, the establishment of the simplified session is not notified to the higher layer protocol handler (i.e., application) than the S.L. protocol handler 1002 in terminal 1.

The session flag in the connection request indicating the simplified session can be replaced by two identifiers indicating the connection request for the simplified session and the connection request for the standard session. In this case, it is also possible to carry out the same function.

Figure 9:
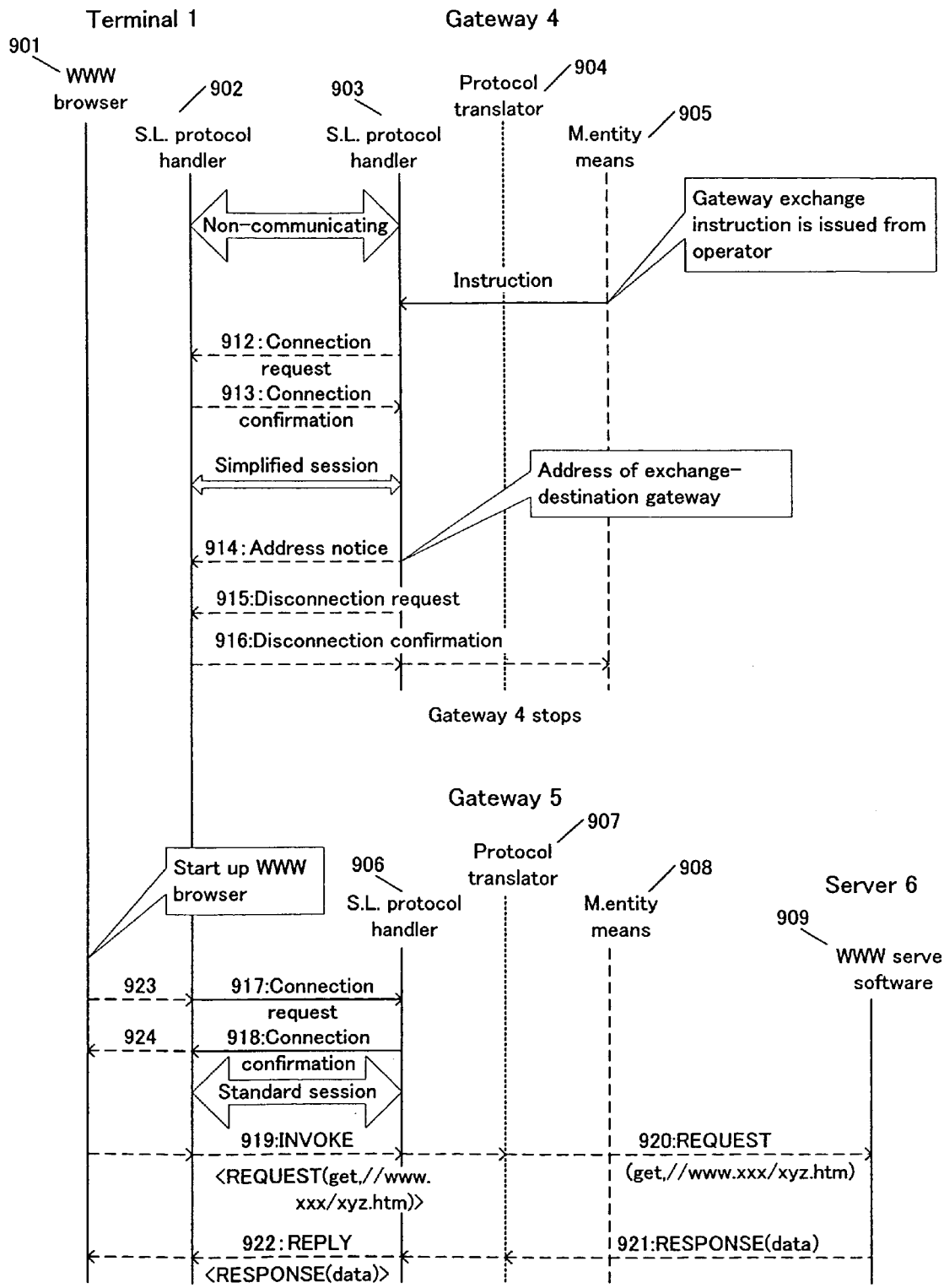
FIG. 9 shows a sequence of the address notice in the embodiment of the invention under the constitution shown in FIG. 1.

After the simplified session shown in FIG. 9 is established according to the above steps, the S.L. protocol handler 903 in the gateway 4 sends an address notice 914 to the S.L. protocol handler 902 in the terminal 1. According to the address notice 914, address changing means in the terminal 1 changes the address from the gateway 4 stored in the memory to the gateway 5.

Following the address notice 914, the S.L. protocol handler 903 in the gateway 4 sends a disconnection request 915 to the S.L. protocol handler 902 in the terminal 1, and the S.L. protocol handler 902 sends a disconnection confirmation 916 to the S.L. protocol handler 903.

After receiving the disconnection confirmation 916, the gateway 4 disconnects the simplified session and is deactivated. At this time, the gateway 4 can be deactivated before receiving the disconnection confirmation 916.

Figure 11:
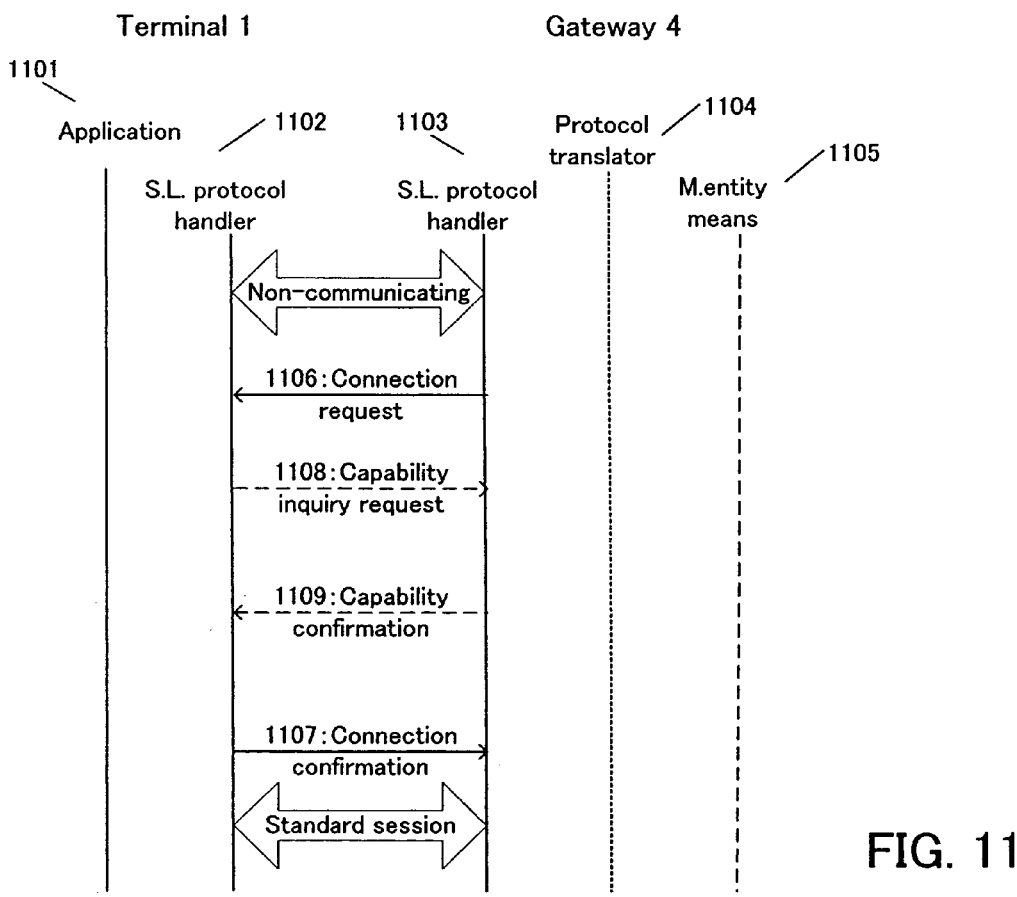
FIG. 11 shows a sequence of establishing the standard session in the embodiment of the invention.

In the above sequence shown in FIG. 9, a standard session may be established in stead of the simplified session as shown in FIG. 11.

To establish the standard session, first, a connection request 1106 is sent from a S.L. protocol handler 1103 in the gateway 4 to a S.L. protocol handler 1102 in the terminal 1. And then the negotiation will be performed as follows. The negotiation means that a terminal and a server exchange one another information (capability) for the data communication, for example, the maximum data size and the window size (the information rate able to be transferred without communication acknowledgement) which can be exchanged between the terminal and the server.

That is, first, the S.L. protocol handler 1102 in the terminal 1 sends a capability inquiry request 1108 to the S.L. protocol handler 1103 in the gateway 4. Next, the S.L. protocol handler 1103 in the gateway 4 sends back a capability confirmation 1109 to the S.L. protocol handler 1102 in the terminal 1. According to the above steps, the capability negotiation can be completed. After the capability negotiation, the S.L. protocol handler 1102 in the terminal 1 notifies the S.L. protocol handler 1103 in the gateway 4 of the establishment of the standard session by sending a connection confirmation 1107. Therefore, the standard session is established.

Meanwhile, in case the negotiation is not established, the S.L. protocol handler 1102 in the terminal 1 can notify the rejection of the session to the S.L. protocol handler 1103 in the gateway 4 by sending a connection confirmation 1107.

The capability inquiry request 1108 can be combined with the connection confirmation 1107 and the capability confirmation 1109 with the connection request 1106 respectively, and can be sent simultaneously as a single data. It is possible to carry out the same function according to such arrangement.

Furthermore, there are various ways to notify the address of the exchange-destination gateway other than the above sequence, and they will be explained in the embodiment 3 of the invention.

Under the condition that the address of gateway 5 is stored in the memory of the terminal 1 according to the above steps and in case an user of the terminal 1 tries to access to a file of a prescribed address in the server 6 by executing the operation (923) of a WWW browser in the terminal 1, the processing to be executed is explained as follows.

First, the S.L. protocol handler 902 in the terminal 1 sends a connection request 917 to the S.L. protocol handler 906 in the gateway 5 by using the address stored by the memory in the terminal 1. And the S.L. protocol handler 906 sends back a connection confirmation 918 to the S.L. protocol handler 902, thereby a standard session is established between the terminal 1 and the gateway 5.

At this time, the exchanging from the gateway 4 to the gateway 5 can be notified to an user of the terminal 1 by the notice 924 of displaying the message on the browser from the S.L. protocol handler 902 in the terminal 1.

Next, the S.L. protocol handler 902 in the terminal 1 sends command 919 as a command in a radio communication protocol to the S.L. protocol handler 906 in the gateway 5.

The command 919 in a radio communication protocol is translated into command 920 as a command of a HTTP (Hypertext Transfer Protocol) by a protocol translator 907 in the gateway 5, and then sent to the server 6.

After a WWW server software 909 in the server 6 receives the command 920, the data of the file is sent back as RESPONSE (data) 921 in HTTP.

The RESPONSE(data) 921 is translated into REPLY<RESPONSE(data)> 922 of a response in a radio communication protocol by the protocol translator 907 in the gateway 5, and then sent to the terminal 1.

According to the above processing the terminal 1 can be in communication with the server 6, and the user can browse the designated file in the WWW server software 909.

Figure 13:
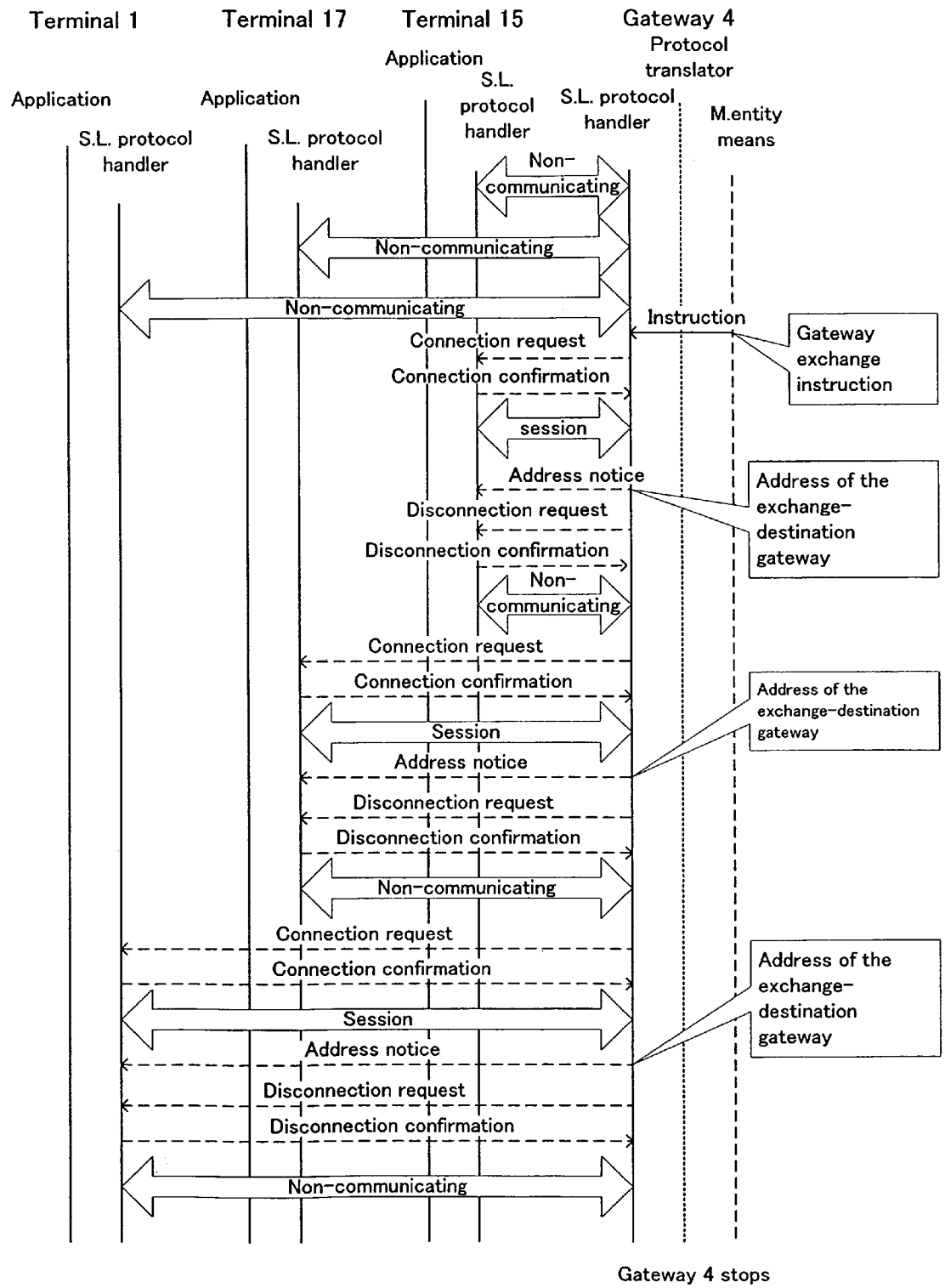
FIG. 13 shows a sequence showing the timing for sending the address notice to a plural terminal in the embodiment of the invention.

In case there is a plural non-communicating terminal, the gateway 4 stops its operation after notifying the address of the exchange-destination gateway to all of said terminals. FIG. 13 shows a timing for notifying the plural terminal of the address of the exchange-destination gateway. The gateway 4 stops its operation after notifying non-communicating terminals 1, 17 and 15 of the address of the exchange-destination gateway 5, according to the sequence shown in FIG. 9.

On the other hand, there is another notifying method called a "broadcasting method" for notifying the broadcast message such as the address notice to every terminal all at once. In this case, following the address notice, the gateway 4 sends the disconnection request to all of the terminals 1, 17 and 15. And after the disconnection confirmation from all of the terminals 1, 17 and 15 arrives at the gateway 4 or before the arrival of the confirmation, the gateway 4 is deactivated.

Figure 2:
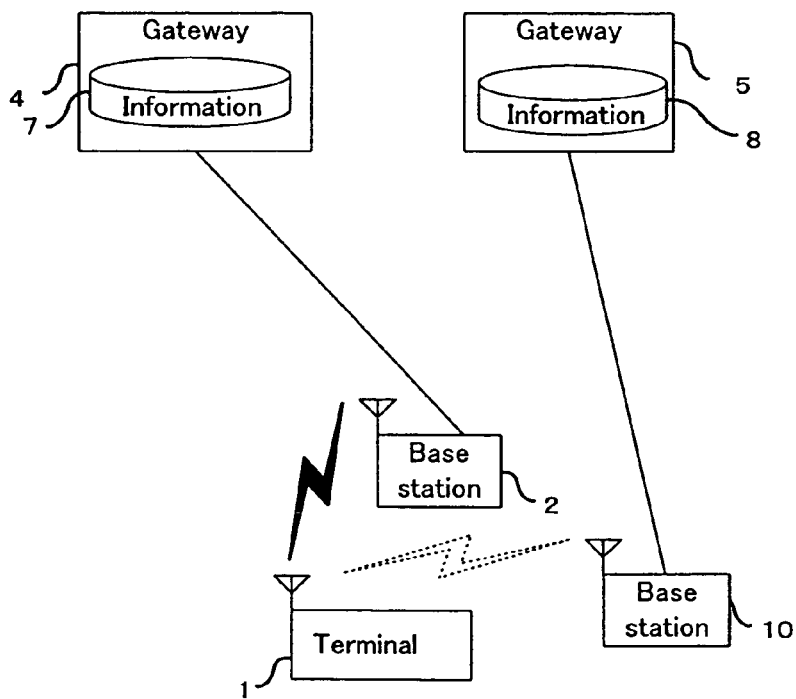
FIG. 2 is a constitutional view of a radio communication system with gateways themselves having information without passing public or in-house network in the embodiment of the invention.

By means of the above steps, the gateway exchanging can be carried out in case of a radio communication system without a network used in a narrow space such as an office shown in FIG. 2 and relative to FIG. 1.

Figure 3:
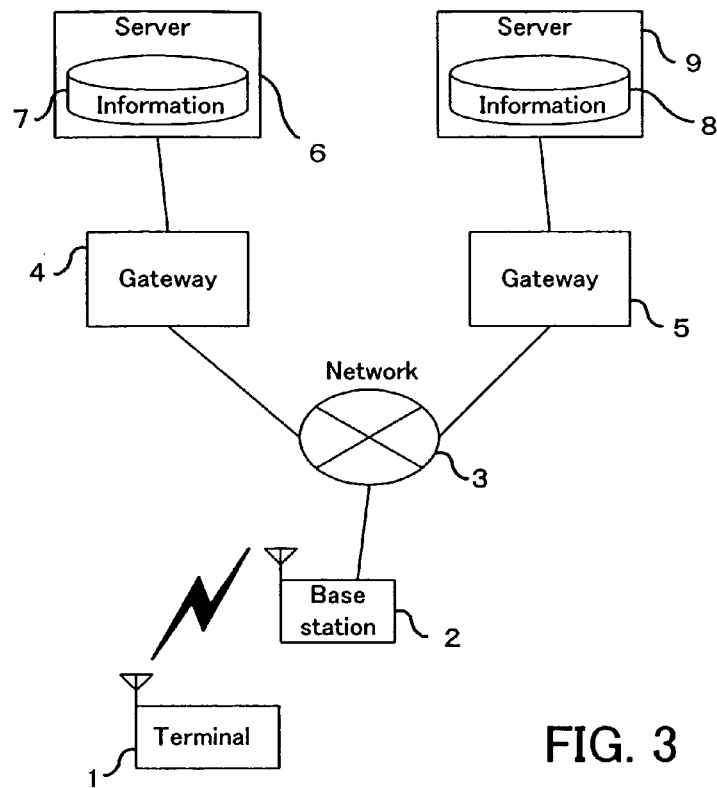
FIG. 3 is a constitutional view of a radio communication system with each gateway connected with its own server via public or in-house network in the embodiment of the invention.
Figure 4:
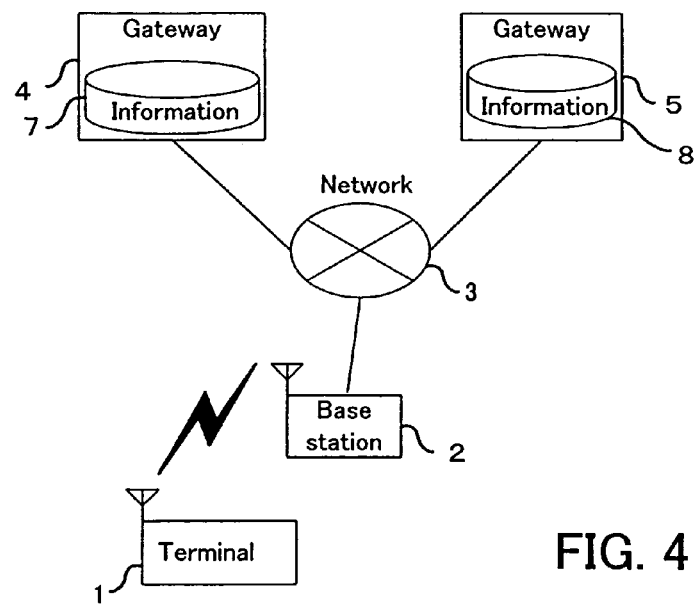
FIG. 4 is a constitutional view of a radio communication system with gateways themselves having information via public or in-house network in the embodiment of the invention.

And in case as shown in FIG. 3 that each server has information to execute a terminal application and the original gateway 4 is connected with a server different from that of the exchange-destination gateway 5, or in case as shown in FIG. 4 that each gateway itself has information to execute a terminal application, if said information is common to all, the gateway exchanging can be carried out according to the above steps.

According to the above sequence, the original gateway can notify a non-communicating terminal of an address of an exchange-destination gateway by means of the simplified session. Therefore even when the gateway exchanging occurs when the terminal is not in communication, the terminal can execute applications accessing to a server via an exchange-destination gateway.

Embodiment 2

Figure 5:
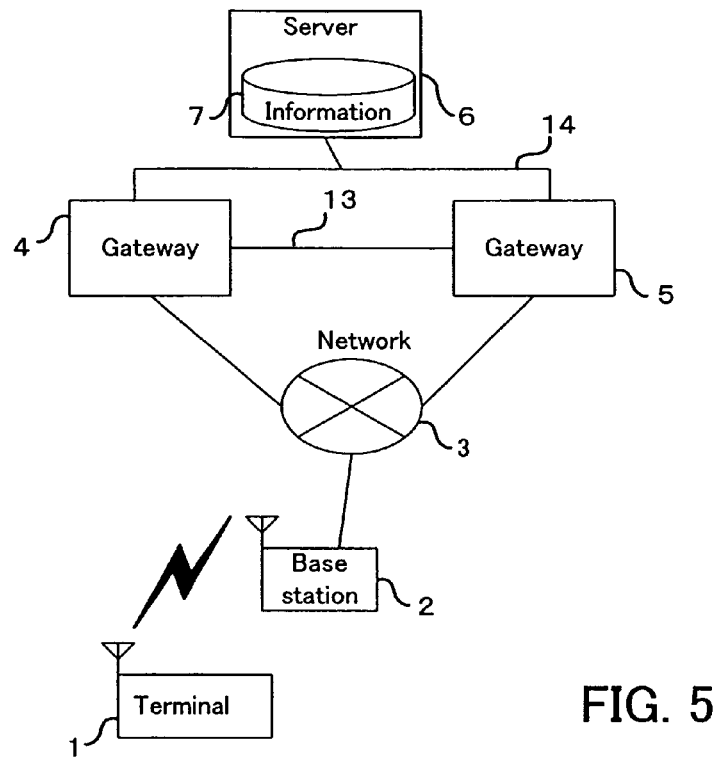
FIG. 5 is a constitutional view of a radio communication system with gateways having connecting means and sharing a common server via public or in-house network in the embodiment of the invention.

FIG. 5 shows a constitution of the radio communication system with a gateway sharing a sever with another gateway via public network in the embodiment 2 of the invention.

A terminal 1 is a radio intelligent terminal such as a Personal Digital Assistant (PDA) including a portable phone. A base station 2 is a base station for a portable phone, and a network 3 is a public network for a portable phone.

A gateway 4 and 5 share a common server 6 and are connected with the network 3 and provided with connecting means 13 to perform the negotiation between gateways in the invention. The connecting means 13 may be connected in cable or wireless, and in stead of said means 13 the connecting method passing through the network 3 or a connecting means 14 among the gateway 4, 5 and the server 6 are available.

The terminal 1 is connected with the server 6 via the base station 2, the network 3, and the gateway 4 or 5, and executes an application using information 7 in the server 6. Likewise the embodiment 1, the terminal 1 is connected with the gateway 4 as an original gateway and stores the address of the gateway 4 in its memory.

Figure 14:
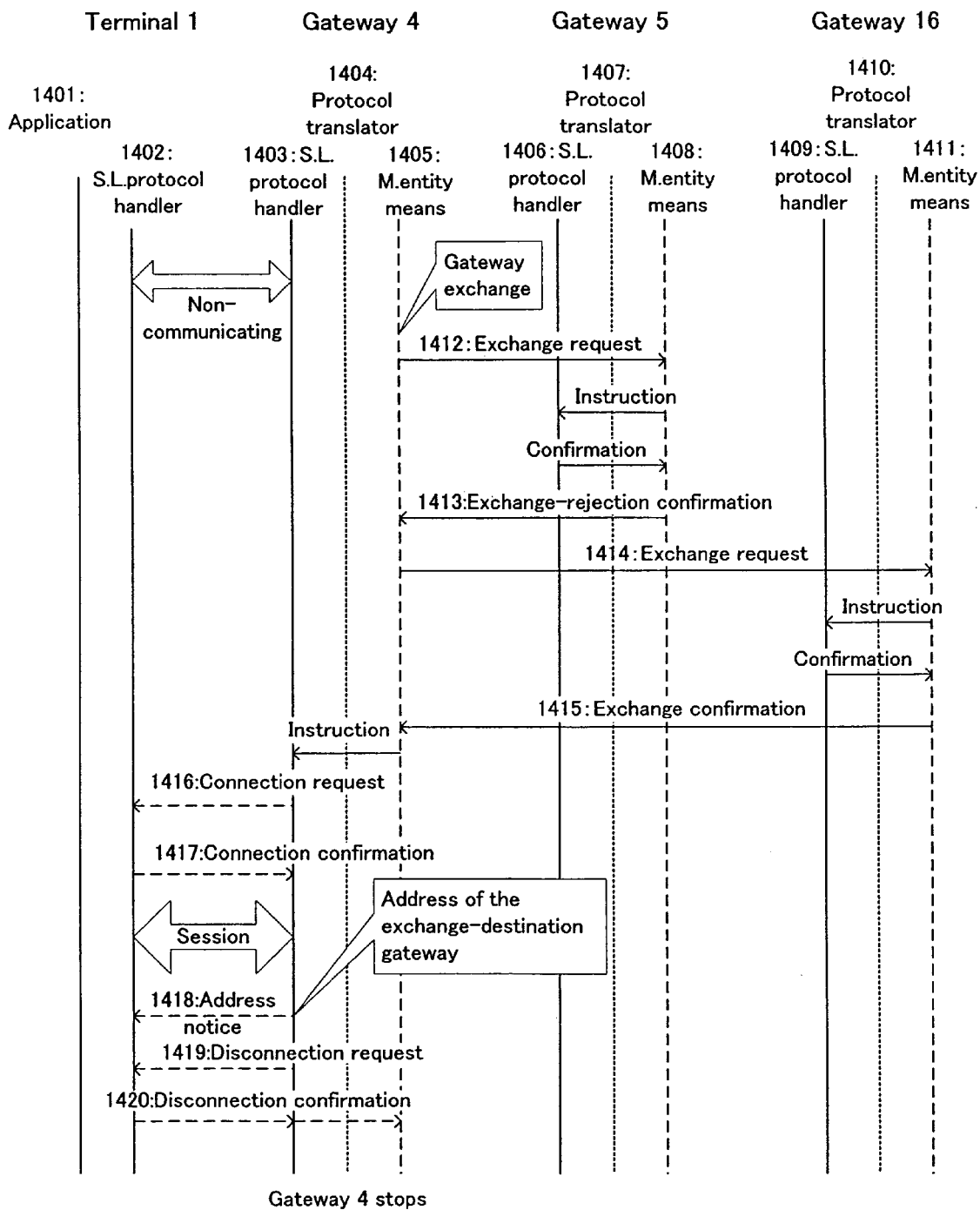
FIG. 14 shows a sequence of the gateway exchanging in the embodiment of the invention.
Figure 15:
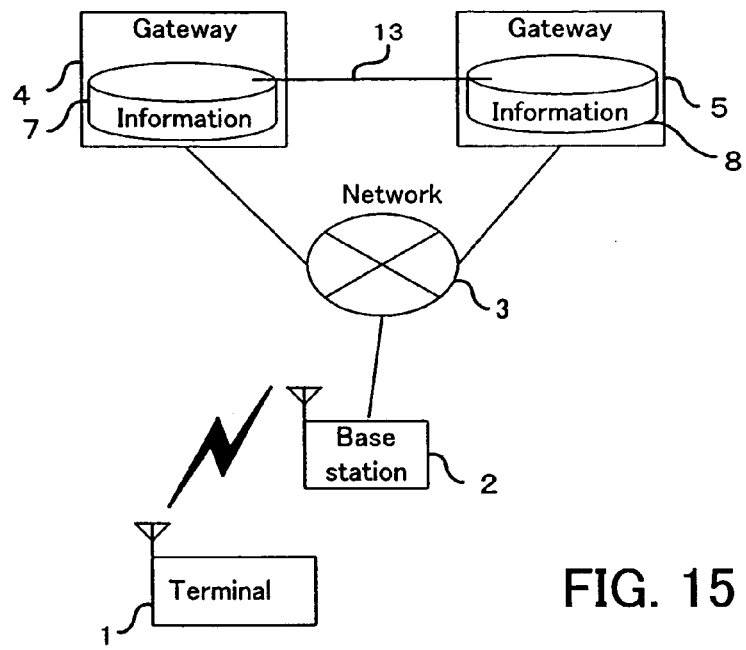
FIG. 15 is a constitutional view of a radio communication system with gateways provided with connecting means and themselves having information via public or in-house network in the embodiment of the invention.

Under these conditions, a sequence for notifying the non-communicating terminal 1 of the exchanging to the gateway 5 in case the gateway needs to be deactivated is explained referring to FIG. 14.

When a gateway exchange instruction is inputted by an operator to the gateway 4, in order to inquire whether or not the gateway 5 can communicate with the terminal 1, a management entity means 1405 (represented by a "M. entity means" hereinafter) in the gateway 4 sends via connecting means 13 to a M. entity means 1408 in the gateway 5 an exchange request 1412 which contains (is attached with) the ability for communication such as data transmission rate of terminal 1.

After receiving the exchange request 1412, the M. entity means 1408 in the gateway 5 determines whether or not the gateway 5 can communicate with the terminal 1 comparing the ability for communication of the terminal 1, that of the gateway 4, and the available numbers of communication ports, and if determined possible, sends to the M. entity means 1405 in the gateway 4 an exchange confirmation including the determination of the "exchange accepted".

In case the gateway 5 rejects the exchange, the M. entity means 1408 sends to the M. entity means 1405 an exchange-rejection confirmation 1413 including the ability for communication of the gateway 5, and the available numbers of the communication ports etc.

Receiving the exchange-rejection confirmation 1413, the M. entity means 1405 in the gateway 4 sends an exchange request 1414 to a M. entity means 1411 in the gateway 16 connected with the gateway 4 via a connecting means like the connecting means 13. And the M. entity means 1411 in the gateway 16 determines whether or not the gateway 16 can communicate with the terminal 1 like the above, and sends back an exchange confirmation 1415 including the determined result to the M. entity means 1405 in the gateway 4.

In case of receiving the exchange confirmation 1415 notifying that the exchange is accepted, the M. entity means 1405 in the gateway 4 instructs a S.L. protocol handler 1403 in the gateway 4 to send a connection request 1416 to a S.L. protocol handler 1402 in the terminal 1.

The sequence after the connection request 1416 is the same as in FIG. 9, which explanation is omitted here.

In case the gateway 4 sends connection requests to all gateways as exchange-destination candidates and receives exchange confirmations with the exchange rejections from all of them, the M. entity means 1405 in the gateway 4 refers to the ability for communication and the available number of communication ports of each gateway included in the exchange confirmations. And the gateway 4 selects one gateway which has the highest ability for communication in them judging from the ability for communication and the available number of communication ports.

Assuming that there are five terminals connected with the gateway 4 as the original gateway and the available number of communication ports are 2 in the gateway 5 and 4 in the gateway 16 respectively, the M. entity means 1405 in the gateway 4 selects the gateway 16 as the gateway with the highest ability for communication because of the most available number of communication ports. And the M. entity means 1405 in the gateway 4 sends a connection request including the address of the gateway 16 to the S.L. protocol handler 1402 in each terminal, finally the gateway 4 is deactivated.

Otherwise, comparing the ability for communication of the exchange-destination candidate gateways and the terminals, the gateway 4 may notify each terminal of an address of an exchange-destination gateway different each other, for example, as an address of an exchange-destination gateway the address of the gateway 16 are notified to three of five terminals and the address of the gateway 5 to the remained two terminals respectively.

Figure 16:
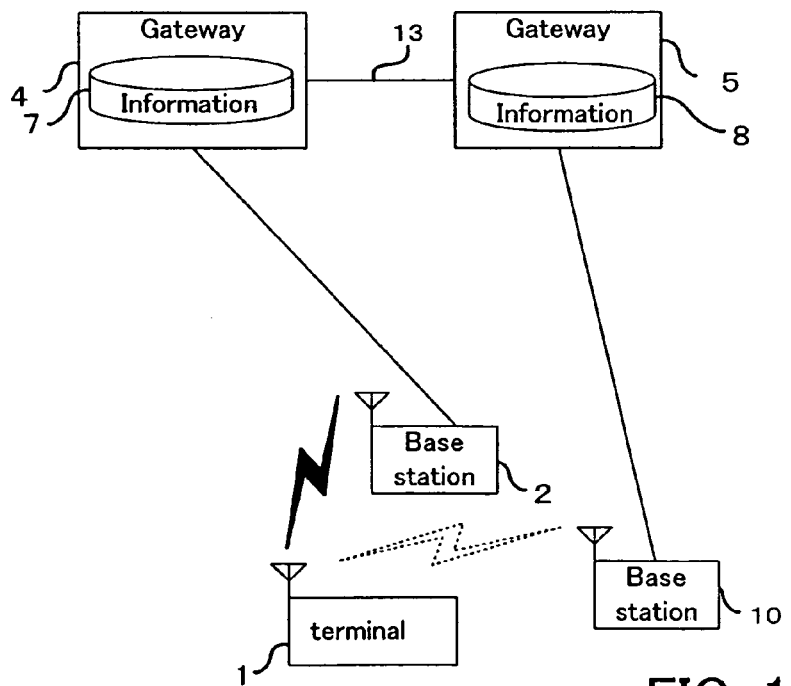
FIG. 16 is a constitutional view of a radio communication system with gateways provided with connecting means and themselves having information without passing public or in-house network in the embodiment of the invention.

By means of the above steps, the gateway exchanging can be carried out in case of a radio communication network without a network used in a narrow space such as an office shown in FIG. 16 and relative to FIG. 5.

Figure 6:
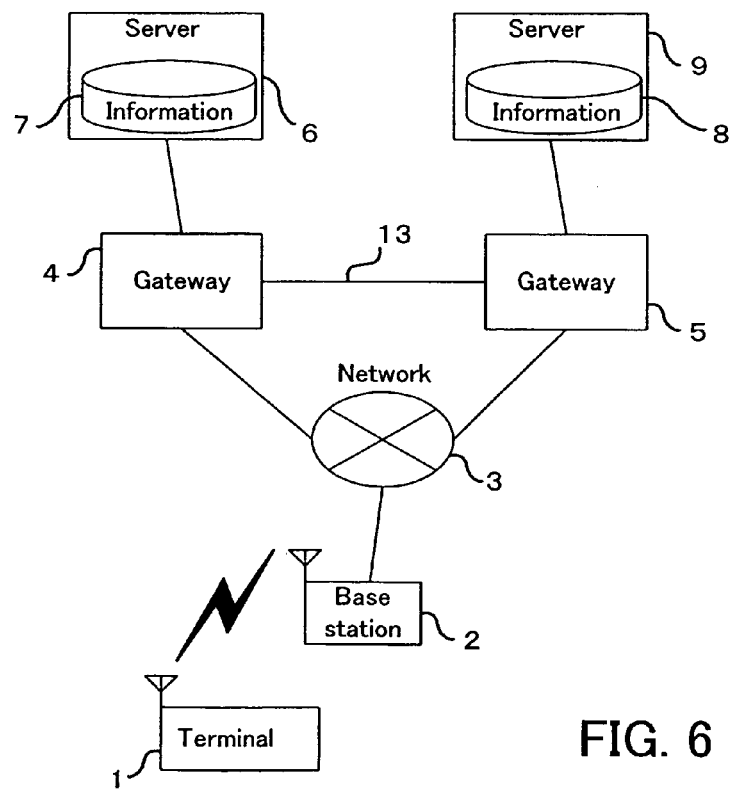
FIG. 6 is a constitutional view of a radio communication system with each gateway having connecting means and connected with its own server via public or in-house network in the embodiment of the invention.
Figure 7:
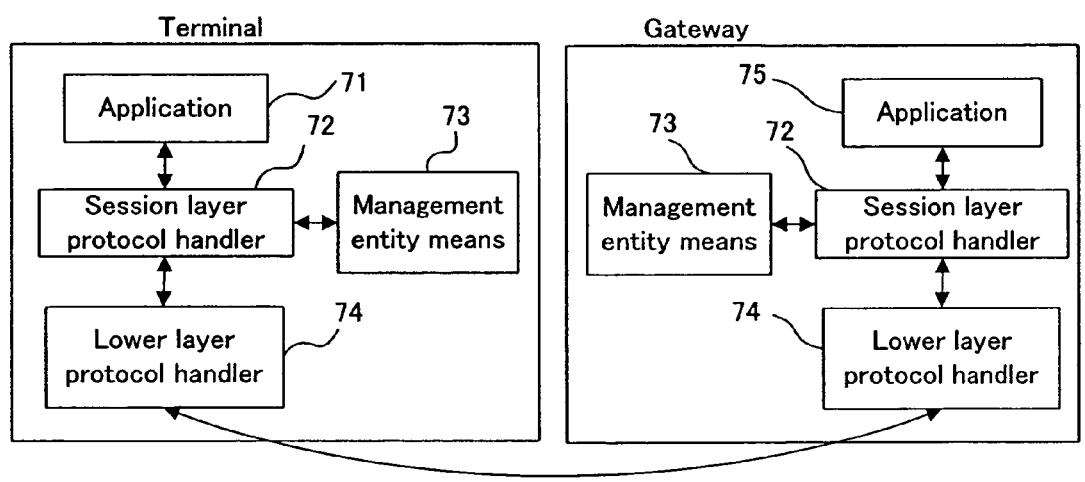
FIG. 7 is a diagram showing the positioning of the session layer protocol handler and the management entity means at session layer in the protocol stack between the terminal and the gateway.

And in case shown as in FIG. 6 that each server has information to execute a terminal application and the exchange-original gateway is connected with a server different from that of the exchange-destination gateway, or in case as shown in FIG. 14 that each gateway itself has information to execute a terminal application, if said information is common to all, the gateway exchanging can be carried out according to the above steps.

According to the above sequence, in case there is connecting means between an original gateway and an exchange-destination gateway, the original gateway can inquire whether or not the exchange-destination gateway is able to communicate with a terminal at the time of the gateway exchanging. Accordingly, even if a exchange-destination gateway stops its system or does not have the ability for communication for the terminal, it is possible to notify the terminal of an exchange-able gateway address by inquiring the capability of other gateways. Furthermore, it is possible to notify the terminal of an address of a gateway which has the highest ability for communication referring to the ability for communication of exchange-destination gateway and the available number of communication ports.

In the above explanation of the embodiments 1 and 2, an original gateway is arranged to stop its operation after the gateway exchanging. But there is not always necessity for stopping the original gateway. The original gateway can continue its running. This method is utilized effectively for changing the connection of a specified terminal to the other gateway in accordance with the occupied condition of the original gateway.

Embodiment 3

Figure 17:
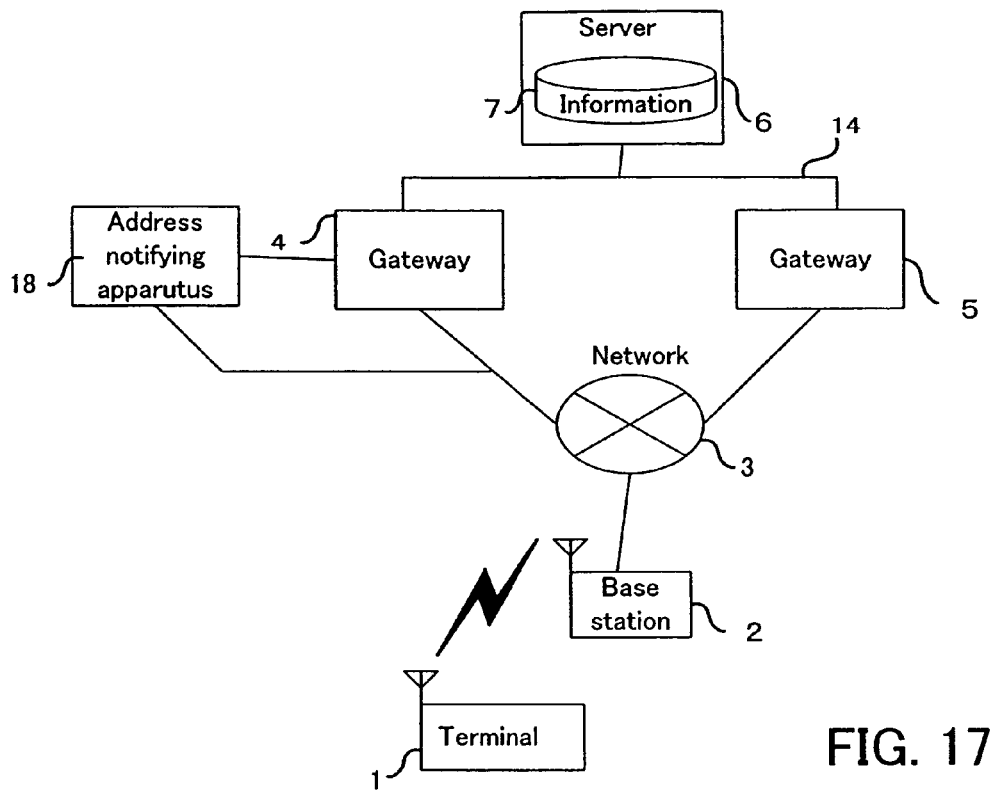
FIG. 17 is a constitutional view of a radio communication system provided with an address notifying apparatus separated from a gateway under the constitution shown in FIG. 1.

FIG. 17 shows the constitution of a radio communication system with gateways having a common server via public network in the embodiment 3 of the invention.

The explanation for a terminal 1, a base station 2, a network 3, gateways 4 and 5, and a server 6 is the same as that of the embodiment 1 of the invention and omitted here. The "disconnecting" terminal referred in below means the status that the terminal is switched off, or the status that the terminal cannot get into communication with a gateway because of standing outside the communication zone even though the switch is turned on.

In this embodiment, address notifying means described in the embodiments 1 and 2 of the invention is replaced by an address notifying apparatus 18 separated from the gateway 4. The address notifying apparatus 18 is, for example, a personal computer provided with a communication function, wherein the memory stores a program executing the address notice in the embodiments 1 and 2 of the invention. Moreover, it may be arranged that the program stored by a removable media such as a CD-ROM or a removable disc is loaded down from the removal media to the memory of the personal computer.

Figure 23:
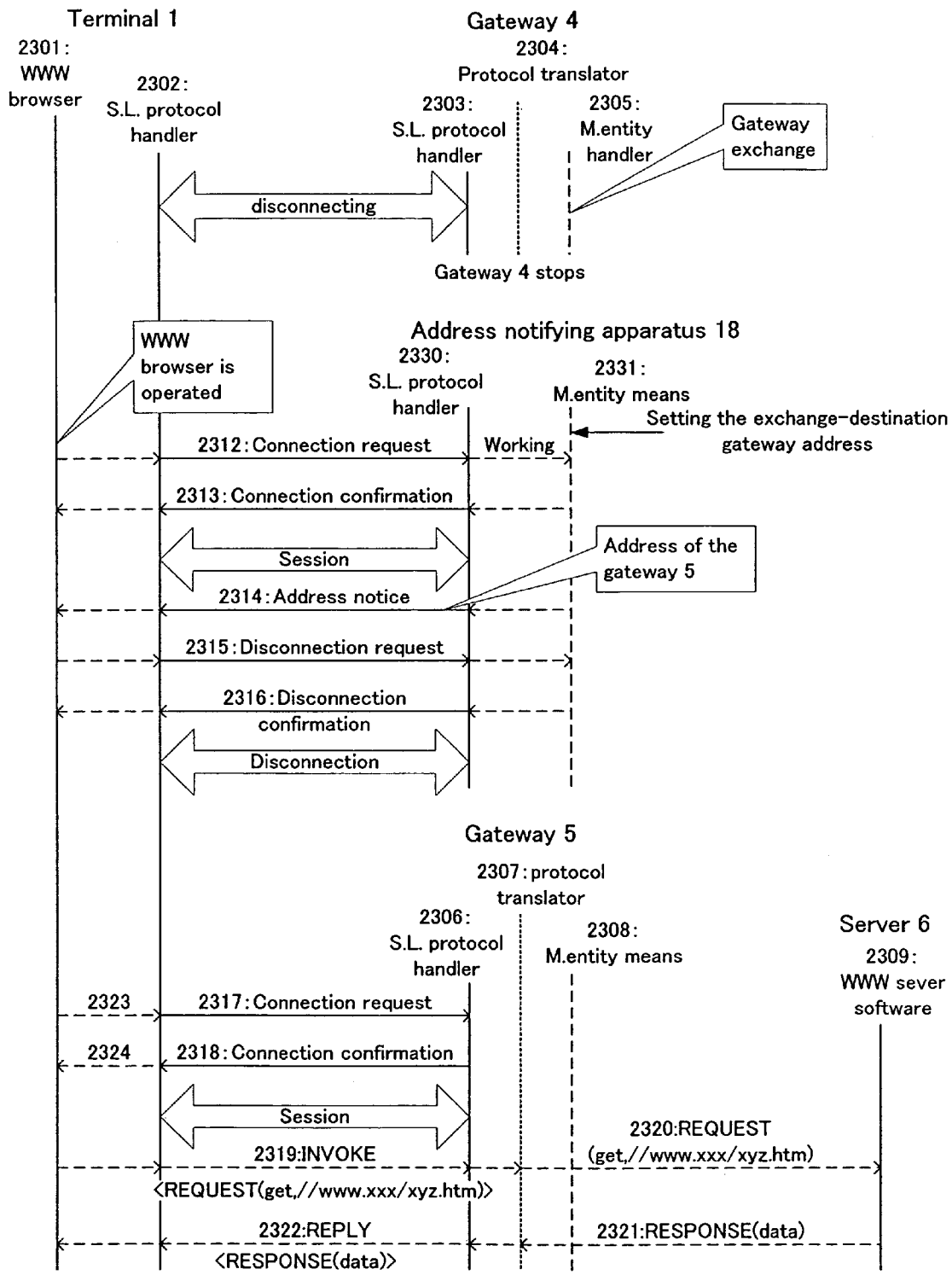
FIG. 23 shows a sequence of the address notice in the embodiment of the invention under the constitution shown in FIG. 17.

Under these constitution, a sequence is explained according to FIG. 23 that, in case the disconnecting terminal is switched on or moves into the communication zone and starts to communicate with the gateway 4 which has bee deactivated, the address notifying apparatus 18 notifies the address of the exchange-destination gateway to the terminal 1.

Figure 8:
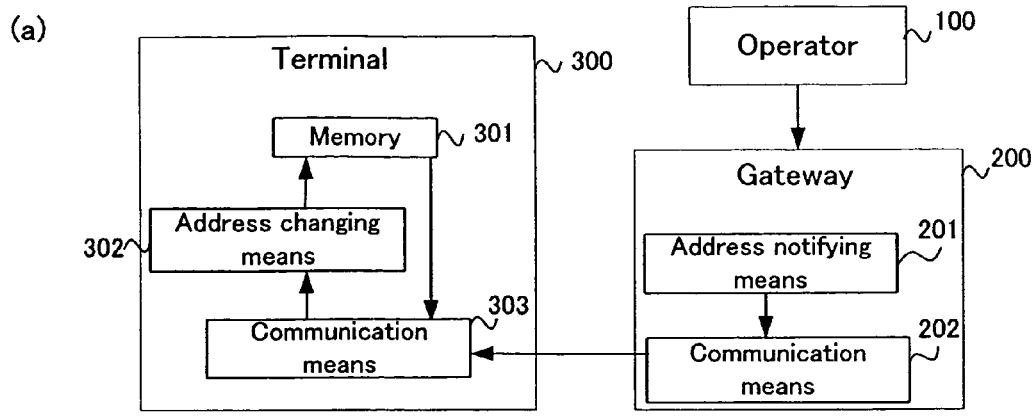
FIG. 8 is a block diagram showing a radio communication system provided with address notifying means in the embodiment of the invention.
Figure 8:
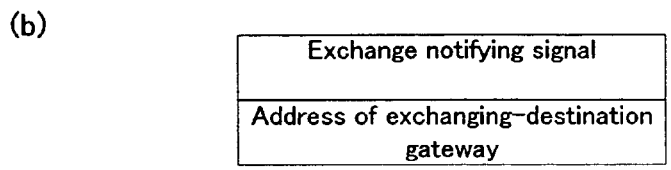
Figure 8:
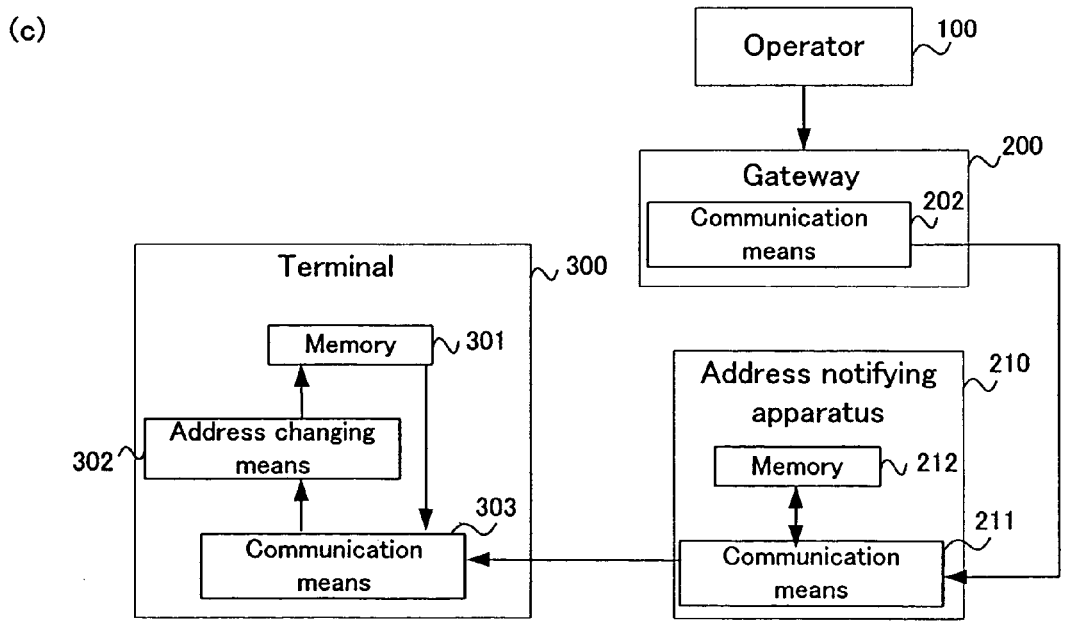

When a gateway exchange instruction is inputted by an operator, the gateway 4 sets an address of the gateway 5 as an exchange-destination gateway in the address notifying apparatus 18. The setting is made as follows. First, a S.L. protocol handler in the gateway 4 sends an address notice shown in FIG. 8(b) to a S.L. protocol handler in the address notifying apparatus 18, and according to the address notice, a M. entity means in the address notifying apparatus 18 stores the address of the gateway 5 in the memory of the address notifying apparatus 18.

The above setting can be executed by means of a public network a radio communication, a dedicated interface, or manually by an operator. And it is possible to set a plural address as exchange-destination gateways.

After setting the address of the gateway 5 as an exchange-destination gateway in the address notifying apparatus 18, the gateway 4 stops the operation.

After the connection is released from the radio communication system because of the shutdown of the gateway, the address notifying apparatus 18 having the same address as the gateway 4 is connected to the communication system and works its operation.

Otherwise, it can be arranged that the address notifying apparatus 18 has an address different from that of the gateway 4 during the working of the gateway 4, and after the shutdown of the gateway 4, the address of the address notifying apparatus 18 is changed to the same as the gateway 4 by an operator manually. This arrangement is effective in case the address notifying apparatus 18 separated from the gateway 4 is provided with the function other than the notifying of an address of an exchange-destination gateway in the radio communication system until the gateway 4 is deactivated, while functions as address notifying means after the shutdown of the gateway 4.

Here, when the terminal can start up the communication because of turning the switch on or of moving into the communication zone of the base station 2, an user of the terminal 1 activates and operates a WWW browser to access to a file //www.xxx/xyz.htm in the server 6 via the original gateway 4, thereby the terminal gets into communication.

In this case, a S.L. protocol handler 2302 in the terminal 1 sends a connection request 2312 to the gateway 4 according to the address stored in the memory of the terminal 1, but the connection request 2312 is received by the address notifying apparatus 18 with the same address as the gateway 4 in stead of the gateway 4.

After receiving the connection request 2312, a S.L. protocol handler 2330 in the address notifying apparatus 18 sends back a connection confirmation 2313 to the terminal 1. Accordingly, the session is established between the terminal 1 and the address notifying apparatus 18, and this session may be either a simplified session or a standard session like as the embodiment 1 of the invention.

And then a S.L. protocol handler 2330 in the address notifying apparatus 18 sends an address notice 2314 following to the connection confirmation 2313, thereby the address of the gateway 5 as an address of an exchange-destination gateway is notified to the terminal 1. According to the address notice 2314, the address of the gateway 4 stored in the memory is changed to the address of the gateway 5.

Next, the S.L. protocol handler 2302 in the terminal 1 sends a disconnection request 2315 to the address notifying apparatus 18. The S.L. protocol handler 2330 in the address notifying apparatus 18 received the disconnection request 2315 sends a disconnection confirmation 2316 to the S.L. protocol handler 2302 in the terminal 1, and then the session is disconnected. Here, the disconnection request 2315 may contain the intention of the disconnection confirmation 2316. And the session can be disconnected without both the disconnection request 2315 and the disconnection confirmation 2316.

It can be also arranged that the disconnection request 2315 is sent from the address notifying apparatus 18 to the terminal 1 and the disconnection confirmation 2316 from the terminal 1 to the address notifying apparatus 18, namely the sender and the receiver as explained above can be exchanged each other.

By these steps, the address of the gateway 5 is stored in the memory in the terminal 1.

The following sequence that an user of the terminal 1 browses a file in the WWW server software in the server 6 via the gateway 5 is the same as that in the embodiment 1 of the invention, which explanation is omitted here.

Regarding the address notifying in the above sequence shown in FIG. 23, there are many methods other than the above. These are explained hereinafter.

Figure 24:
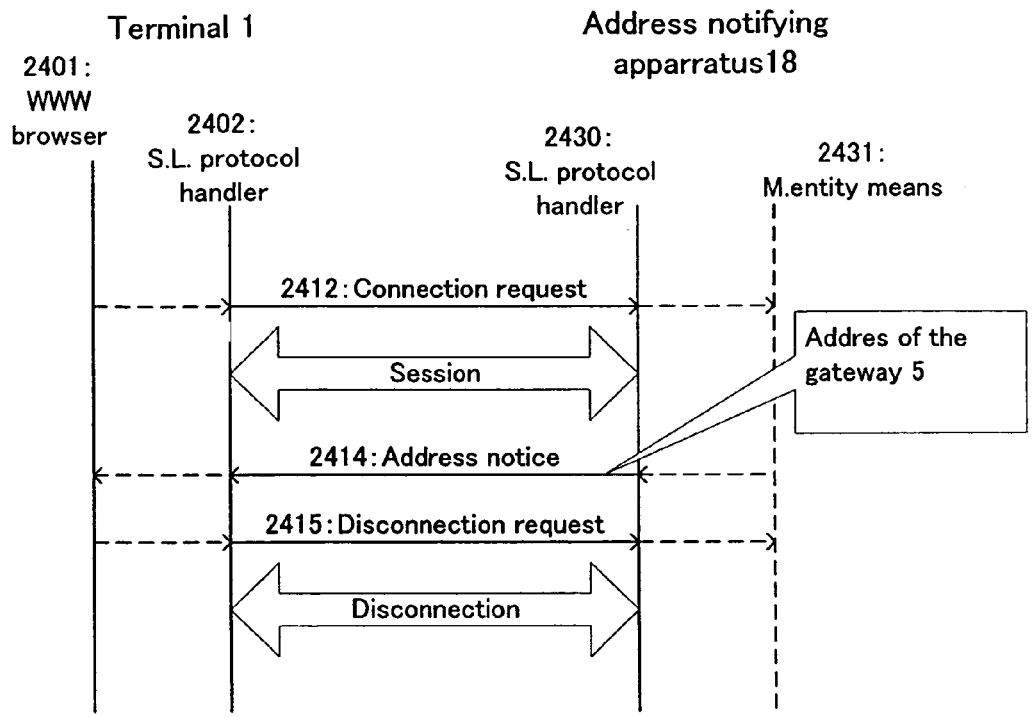
FIG. 24 shows an example of address notifying method in the embodiment of the invention.

One of the address notifying is shown in FIG. 24. In FIG. 24, a connection request 2412 is sent from a S.L. protocol handler 2402 in the terminal 1 and received by the address notifying apparatus 18 which has the same address as the gateway 4. The sequence up to here is the same as in FIG. 23.

After receiving the connection request 2412, a S.L. protocol handler 2430 in the address notifying apparatus 18 has established a session without receiving the connection confirmation. And the S.L. protocol handler 2430 in the address notifying apparatus 18 notifies the address of the gateway 5 as an exchange-destination gateway to the terminal 1 by sending an address notice 2414.

According to the address notice 2414, address changing means in the terminal 1 changes from the address of the gateway 4 stored in the memory of the terminal 1 to that of the gateway 5. And the S.L. protocol handler 2402 in the terminal 1 sends back a disconnection request 2415 to the address notifying apparatus 18. After that, the session is disconnected even if the S.L. protocol handler 2430 in the address notifying apparatus 18 has not send a disconnection confirmation.

Figure 25:
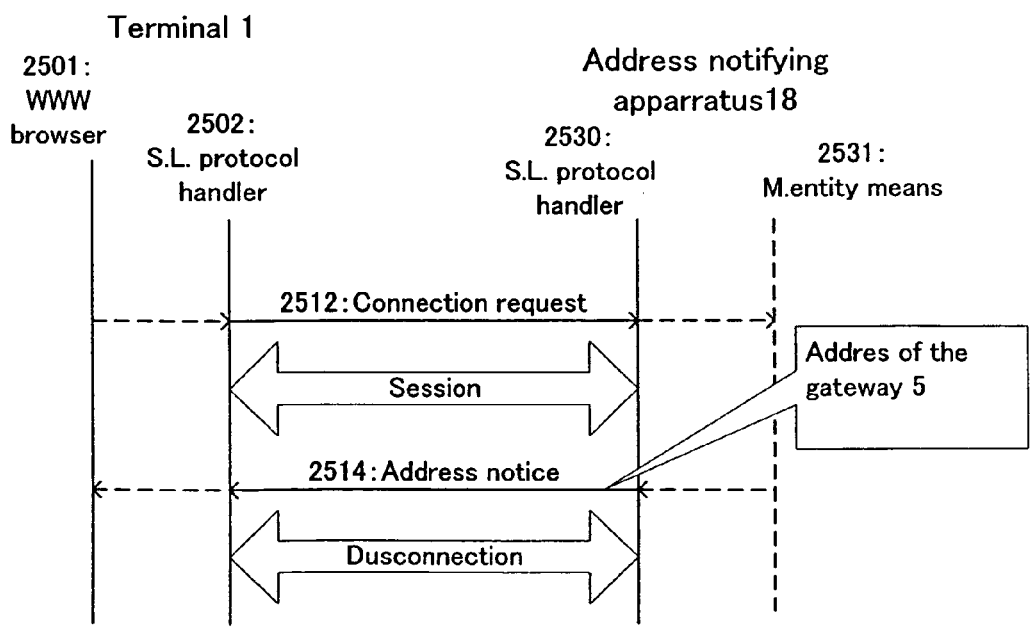
FIG. 25 shows an example of address notifying method in the embodiment of the invention.

Here, as well as the sequence shown in FIG. 23, the disconnection request 2415 contains a meaning of a confirmation for the address notice 2414. And the session may be disconnected without sending the disconnection request 2415. Otherwise, in stead of the disconnection request 2415, the confirmation for the address notice may be sent from the S.L. protocol handler 2402 in the terminal 1 to the S.L. protocol handler 2430 in the address notifying apparatus 18. The sequence without sending both the disconnection request 2415 and the confirmation for the address notice is shown in FIG. 25. It may be arranged that the session established in FIGS. 24 and 25 is either a simplified session or a standard session explained in the embodiment 1 of this invention.

Next, the sequence shown in FIG. 26 will be explained hereinafter.

A connection request 2612 sent from a S.L. protocol handler 2602 in the terminal 1 is received by a S.L. protocol handler 2630 in the address notifying apparatus 18. A sequence up to here is the same as in FIGS. 23, 24 and 25. After receiving the connection request 2612, the S.L. protocol handler 2630 sends a connection rejection 2614 including the address of the exchange-destination gateway 5 to the terminal 1.

According to the connection rejection 2614, the terminal 1 changes from the address of the gateway 4 stored in the memory to that of the gateway 5. That is, in the sequence shown in FIG. 26, the changing of the address is performed even though the session is not established between the terminal 1 and the address notifying apparatus 18.

Figure 26:
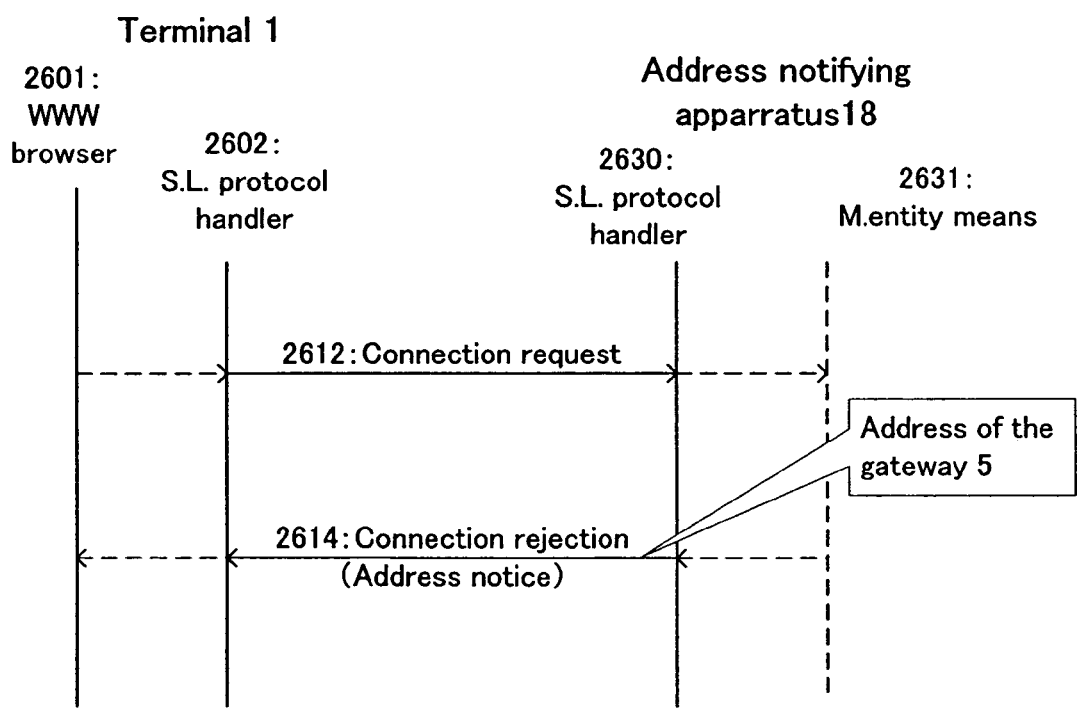
FIG. 26 shows an example of address notifying method in the embodiment of the invention.

The above sequence shown in FIG. 26 can be simplified further more. Namely, without sending the connection request 2612 and the connection rejection 2614, the address notice can be sent directly to the terminal. It is called a "connectionless transmission method".

As explained in the embodiment 1 of the invention, there is a broadcasting method for sending the address notice to every terminal all at once. In case of making a use of the broadcasting method, it is not necessary to send the address notice to each disconnecting terminal whenever it starts up the communication. And in case of sending the address notice not only once but repeatedly, it is possible to notify the address of an exchange-destination gateway to every terminal starting up the communication.

In this case, if the gateway 4 sets in the address notifying apparatus 18 every said terminal address (IP address) at the same time of setting the address of an exchange-destination gateway, the broadcasting can be completed after confirming that the address notice is sent to every terminals as described below.

That is, when a terminal received the address notice is connect with the exchange-destination gateway 5, the exchange-destination gateway 5 notifies the address notifying apparatus 18 that the gateway 5 is connected with the terminal. According to the said connection notice, the address notifying apparatus 18 stops sending the address notice to the terminal.

Figure 27:
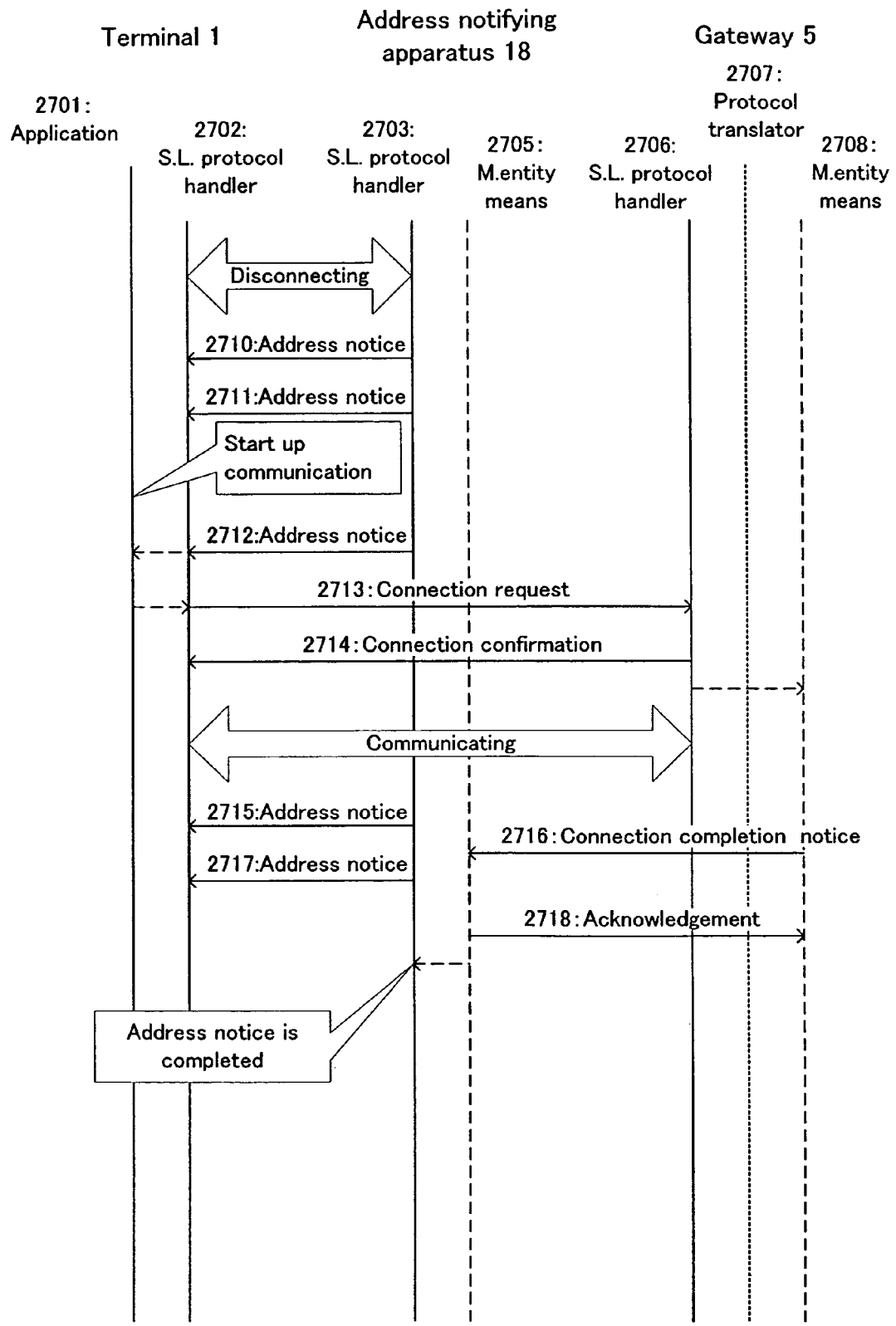
FIG. 27 shows an example of address notifying method in the embodiment of the invention.

The sequence of the above address notice in connectionless mode is explained with reference to FIG. 27.

Assuming that the gateway 4 sets in the address notifying apparatus 18 the address of the exchange-destination gateway 5 and the terminal addresses to be connected with the gateway 4 as the original gateway, and then is deactivated its function. And the terminal 1 to be connected with the gateway 4 as the original gateway is in the disconnecting status.

A S.L. protocol handler 2703 in the address notifying apparatus 18 periodically sends address notices to all terminals including the terminal 1 to be connected with the gateway 4 as the original gateway. Among those address notices, address notices 2710 and 2711 sent to the disconnecting terminal 1 are not received by the terminal 1, and an address notice 2721 is not received by the terminal 1 until the terminal 1 gets to be in the state able to communicate.

According to the address notice 2721, address changing means in the terminal 1 changes from the address of the gateway 4 stored in the memory in the terminal 1 to that of the exchange-destination gateway 5. And a S.L. protocol handler 2702 in the terminal 1 sends a connection request 2713 to the gateway 5 in order to be connected with the gateway 5. Therefore, address notices 2715 and 2717 received after sending the connection request 2713 should be disregarded by the S.L. protocol handler 2702 in the terminal 1.

Receiving the connection request 2713, a S.L. protocol handler 2706 in the gateway 5 sends a connection confirmation 2714 to the terminal 1. Then a standard session is established between the terminal 1 and the gateway 5, and the terminal 1 gets to be in communication.

At this time, a S.L. protocol handler 2706 in the gateway 5 notifies a M. entity means 2708 in the gateway 5 that the gateway 5 is in communication with terminal 1. And the M. entity means 2708 sends a connection completion notice 2716 including the terminal address to a M. entity means 2705 in the address notifying apparatus 18, and notifies that the terminal 1 has completed the gateway exchanging.

Receiving the connection completion notice 2716, the M. entity means 2705 in the address notifying apparatus 18 sends an acknowledgement 2718 to the M. entity means 2708 in the gateway 5 and then the S.L. protocol handler 2703 in the address notifying apparatus 18 terminates the program of the address notice to the terminal 1.

Therefore, it does not need to execute a step of sending the connection request from the terminal 1 to the address notifying apparatus 18 in case the address notice is performed by means of the connectionless transmission method. And it is possible to simplify the sequence.

Moreover, the connectionless transmission method can be utilized for the services charged terminal users for sending address notices only to specified terminals.

Figure 18:
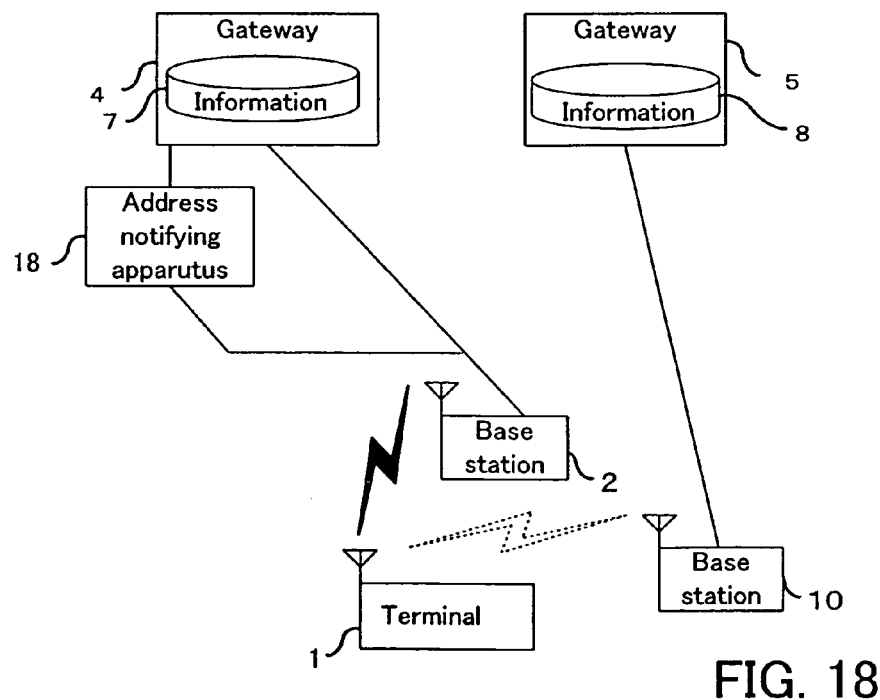
FIG. 18 is a constitutional view of a radio communication system provided with an address notifying apparatus separated from a gateway under the constitution shown in FIG. 2.

By means of the above steps, the gateway exchanging can be carried out in case of a radio communication network without a network used in a narrow space such as an office shown in FIG. 18 and relative to FIG. 1.

Figure 19:
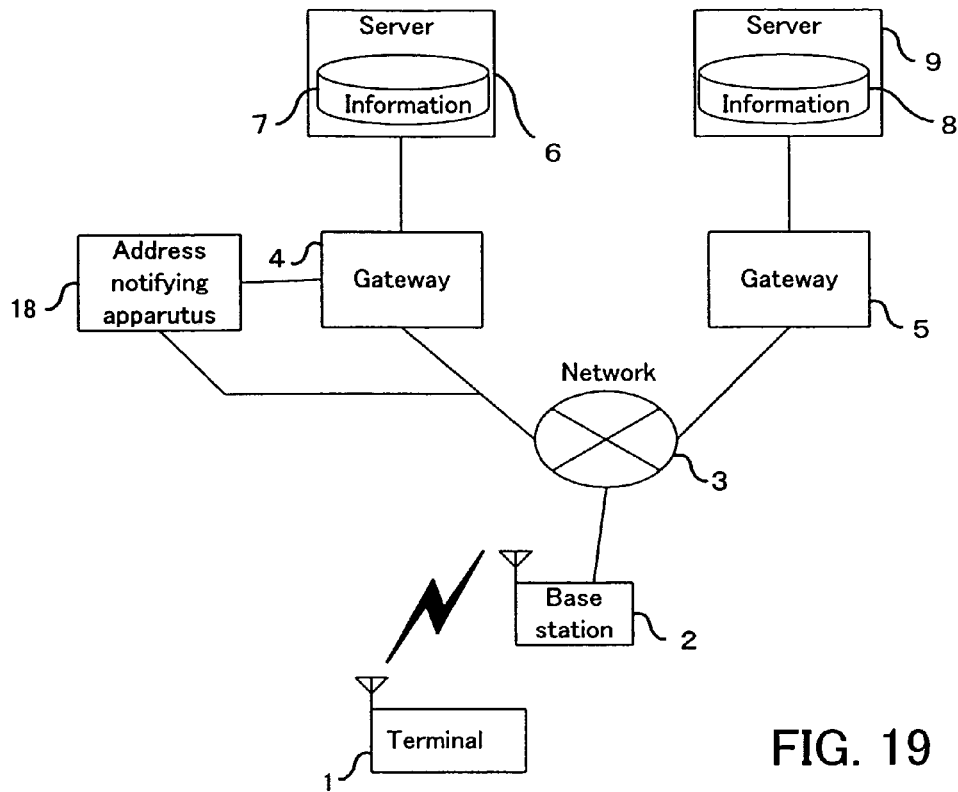
FIG. 19 is a constitutional view of a radio communication system provided with an address notifying apparatus separated from a gateway under the constitution shown in FIG. 3.
Figure 20:
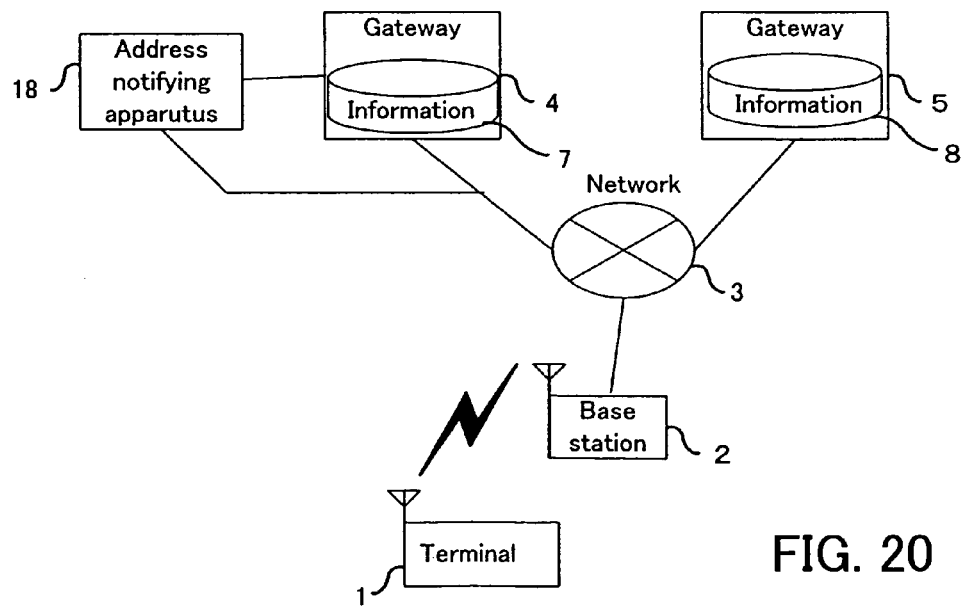
FIG. 20 is a constitutional view of a radio communication system provided with an address notifying apparatus separated from a gateway under the constitution shown in FIG. 4.

And in case as shown in FIG. 19 that each server has information to execute a terminal application and the exchange-original gateway is connected with a server different from that of the exchange-destination gateway, or in case as shown in FIG. 20 that each gateway itself has information to execute a terminal application, if said information is common to the original gateway and the exchange-destination gateway, the gateway exchanging can be carried out according to the above steps.

According to the above sequence, even if an original gateway is deactivated because of the gateway exchanging while terminals are disconnected, an address notifying apparatus can be connected with terminals and change to the address of the exchange-destination gateway from an original gateway address stored in the terminals. Accordingly, the terminals can access to the server and execute applications via the exchange-destination gateway.

Embodiment 4

Figure 21:
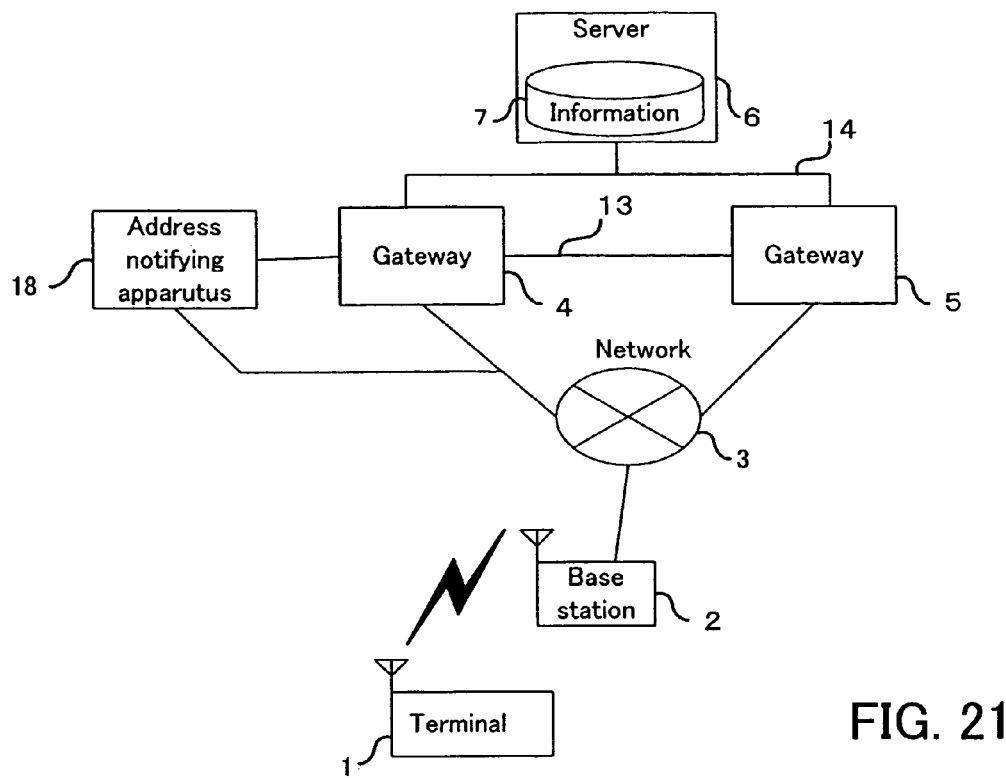
FIG. 21 is a constitutional view of a radio communication system provided with an address notifying apparatus separated from a gateway under the constitution shown in FIG. 5.

FIG. 21 shows a constitution of the radio communication system with gateways sharing a server with each other via public network in the embodiment 4 of the invention.

The explanation for a terminal 1, a base station 2, a network 3, gateways 4 and 5, a server 6, and connecting means 13 is the same as that in the embodiment 2 of the invention, and is omitted here.

Figure 28:
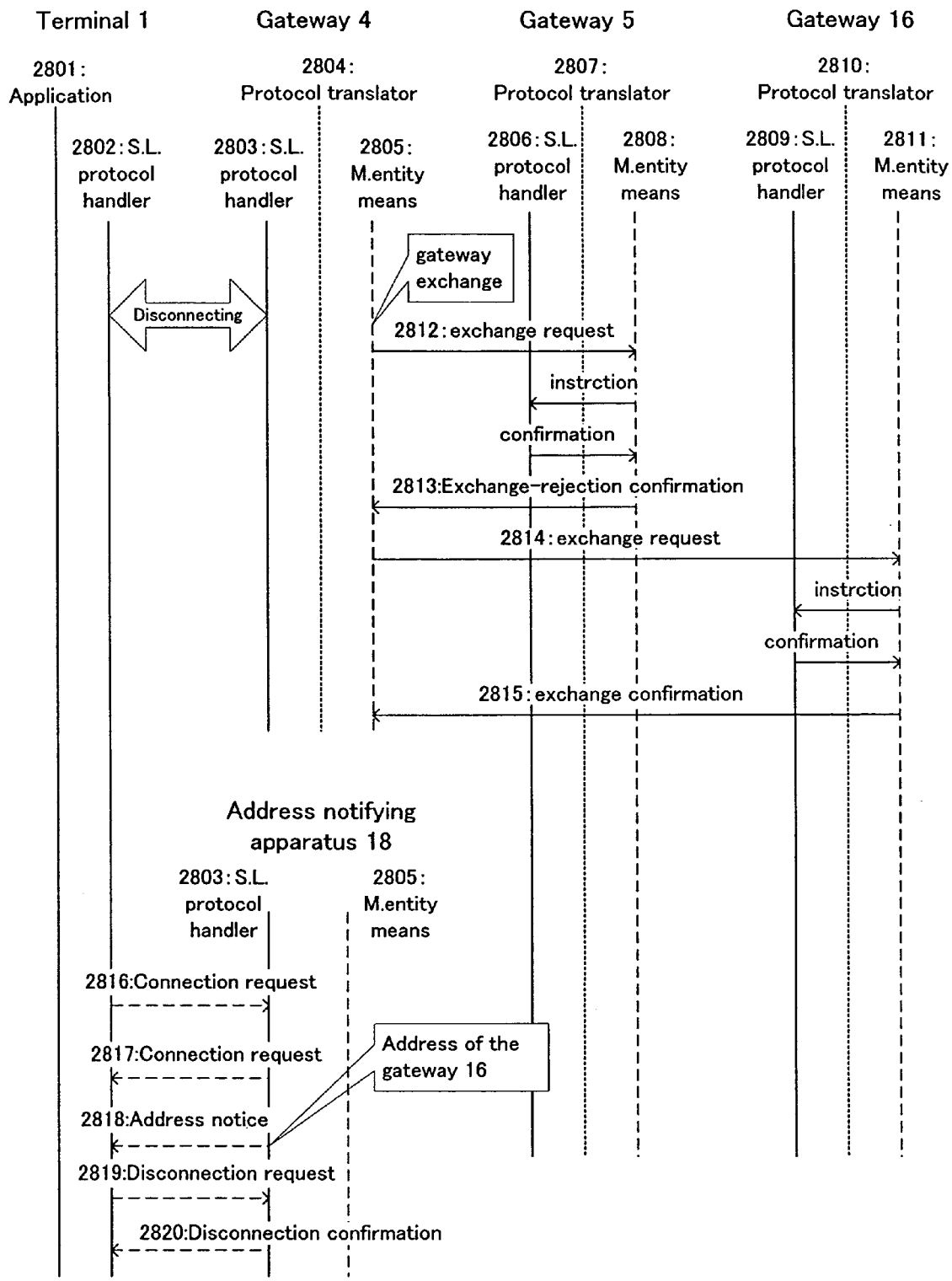
FIG. 28 shows a sequence of the gateway exchanging in the embodiment of the invention.

Under these constitution, a sequence is explained referring to FIG. 28 that the address notifying apparatus notifies the terminal 1 of the address of the exchange-destination gateway when the disconnecting terminal 1 gets into communication with the inactive gateway 4.

In case a gateway exchange instruction is inputted to the gateway 4 by an operator, after a M entity means 2806 in the gateway 5 determines whether or not the gateway 5 can communicate with the terminal 1, an exchange-rejection confirmation is sent out as a result of the determination, and then a M. entity means 2811 in a gateway 16 sends an exchange confirmation 2815 to a M. entity means 2805 in the gateway 4. The sequence up to this step is the same as that in the embodiment 2 of the invention, which explanation is omitted here. It may be arranged in the embodiment 4 that the negotiation with the gateway 16 is executed by the address notifying apparatus 18.

After being notified by the exchange confirmation 2815 that the gateway 16 can communicate with the terminal 1, the gateway 4 set in the address notifying apparatus 18 the address of the gateway 16 as an exchange-destination gateway.

The above setting for changing the address of the exchange-destination gateway in the address notifying apparatus 18 can be executed via a public network a radio communication, a dedicated interface, or by an operator of the gateway 4 manually as in the embodiment 3. After the above setting of the address, the gateway 4 is deactivated.

The address notifying apparatus 18 starts up having the same address as the gateway 4 after the shutdown of the gateway 4, and the terminal 1 stores an address of the exchange-destination gateway (in this case, gateway 16). The sequence of these steps are the same as in the embodiment 3 of the invention (shown in FIG. 23), which explanation is omitted here.

And the gateway 4 sends connection requests to all of the exchange-destination candidate gateways, and selects the highest ability for communication with the terminal 1 according to the ability for communication and the available number of communication ports included in the exchange confirmation, and then set the address of the selected gateway in the address notifying apparatus 18. These steps are the same as in the embodiment 2 of the invention, which explanation is omitted here.

Figure 30:
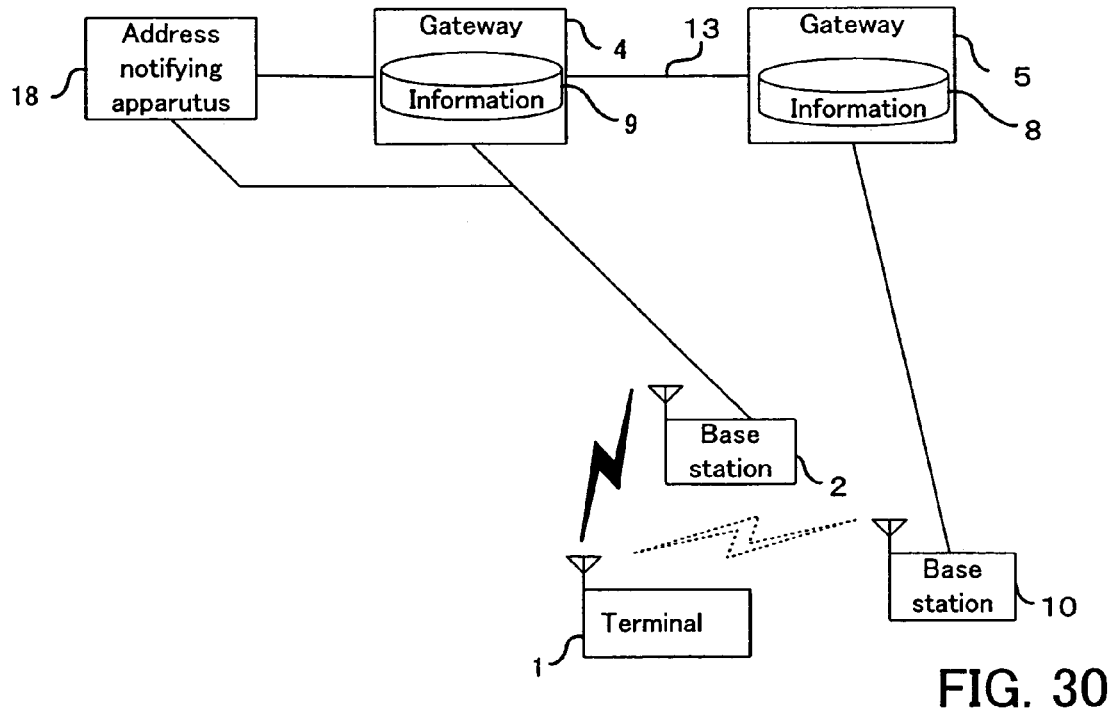
FIG. 30 is a constitutional view of a radio communication system provided with an address notifying apparatus separated from a gateway under the constitution shown in FIG. 16.
Figure 31:
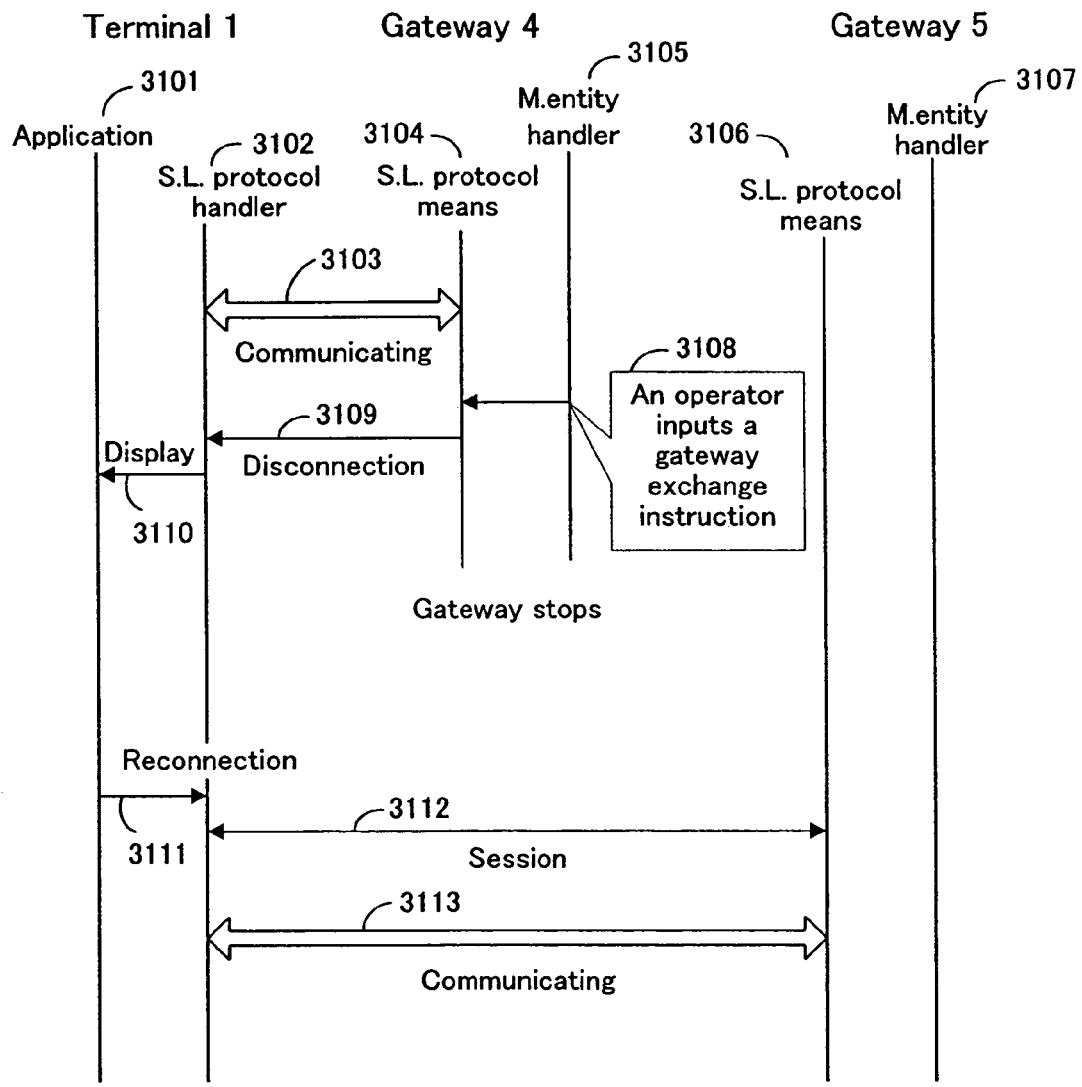
FIG. 31 shows a sequence of the conventional gateway exchanging under the constitution shown in FIG. 2.

By means of the above steps, the gateway exchanging can be carried out in case of a radio communication system without a network used in a narrow space such as an office shown in FIG. 30 and relative to FIG. 21.

Figure 22:
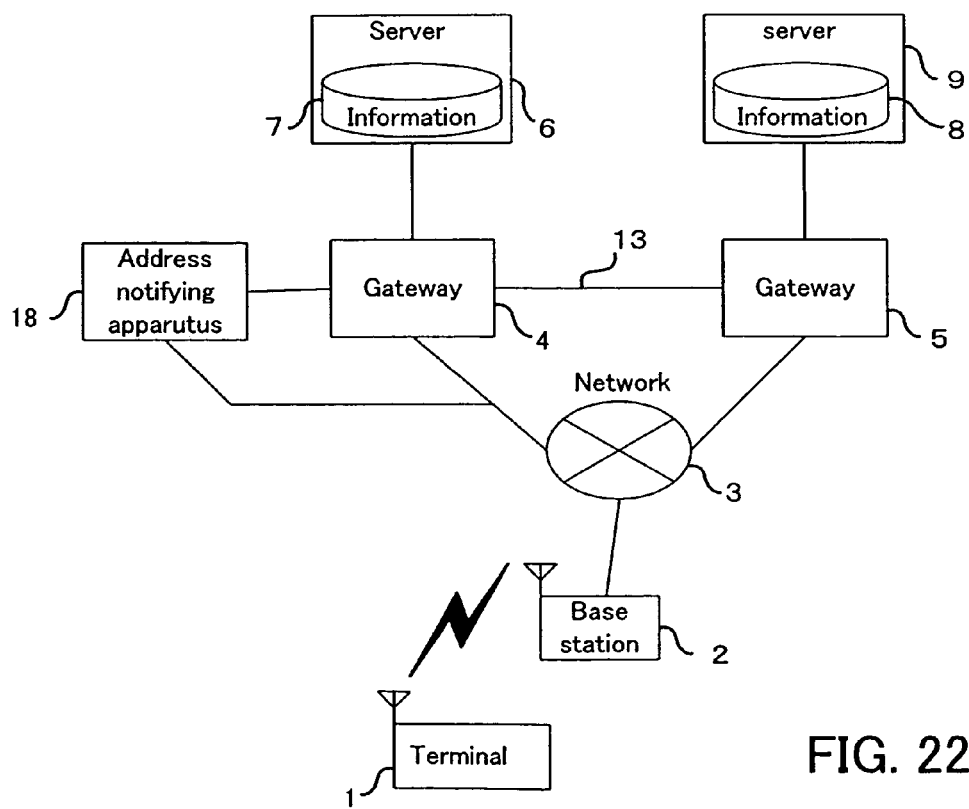
FIG. 22 is a constitutional view of a radio communication system provided with an address notifying apparatus separated from a gateway under the constitution shown in FIG. 6.
Figure 29:
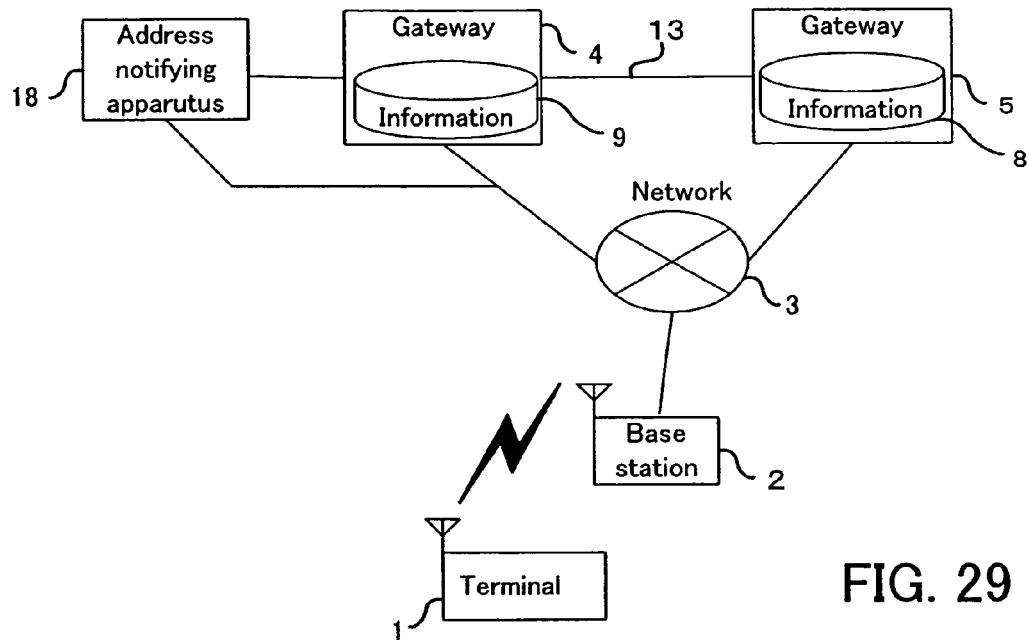
FIG. 29 is a constitutional view of a radio communication system provided with an address notifying apparatus separated from a gateway under the constitution shown in FIG. 15.

And in case as shown in FIG. 22 that each server has information to execute a terminal application and the exchange-original gateway is connected with a server different from that of the exchange-destination gateway, or in case as shown in FIG. 29 that each gateway itself has information to execute a terminal application, if said information is common to the original gateway and the exchange-destination gateway, the gateway exchanging can be carried out according to the above steps.

According to the above-mentioned sequence, in case of the gateway exchanging like in the embodiment 2, it is possible to perform the negotiation with the other gateways and notify terminals of the address of the exchange-destination gateway with the highest ability for communication.

As described above, in case of the gateway exchanging, it is possible in the radio communication system in the invention to notify the address of the exchange-destination gateway to non-communicating or disconnecting terminals accurately. Therefore, a terminal user can execute applications at any time via the exchange-destination gateway without giving any attention to the gateway exchanging. And it is possible to prevent from storing much more gateway address by a terminal.

What is claimed is:

1. A gateway relaying the communication between a radio intelligent terminal and a server offering services to the radio intelligent terminal, comprising:
   a means for establishing a logical session with the terminal by sending a connection request to the terminal and receiving a connection confirmation from the terminal in response to the connection request; and
   address notifying means for notifying an address of an exchange-destination gateway to the terminal after the logical connection is established.

* * * * *